United States Patent
Numata et al.

(10) Patent No.: US 10,545,431 B2
(45) Date of Patent: Jan. 28, 2020

(54) MANUFACTURING METHOD OF CARTRIDGE AND CARTRIDGE

(71) Applicant: CANON KABUSHIKI KAISHA, Tokyo (JP)

(72) Inventors: Tetsuya Numata, Suntou-gun (JP); Makoto Hayashida, Numazu (JP); Naoki Maeda, Suntou-gun (JP); Kayo Mitsugi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/209,747

(22) Filed: Dec. 4, 2018

(65) Prior Publication Data

US 2019/0196358 A1 Jun. 27, 2019

(30) Foreign Application Priority Data

Dec. 27, 2017 (JP) .................................. 2017-252541

(51) Int. Cl.
*G03G 15/08* (2006.01)
*B29C 65/18* (2006.01)

(52) U.S. Cl.
CPC ............ *G03G 15/087* (2013.01); *B29C 65/18* (2013.01); *G03G 15/0894* (2013.01); *G03G 2215/00987* (2013.01)

(58) Field of Classification Search
CPC ......... G03G 21/181; G03G 2221/1853; G03G 2221/1884; G03G 2221/1654; G03G 15/0872; G03G 2215/00987

See application file for complete search history.

(56) References Cited

U.S. PATENT DOCUMENTS

| 9,164,419 B2 | 10/2015 | Uneme |
| 2003/0113131 A1 | 6/2003 | Watanabe et al. |
| 2004/0136746 A1* | 7/2004 | Komatsu .............. G03G 21/181 |
| | | 399/104 |
| 2014/0161484 A1* | 6/2014 | Uneme .............. G03G 15/0875 |
| | | 399/111 |

(Continued)

FOREIGN PATENT DOCUMENTS

| EP | 2796935 A1 | 10/2014 |
| JP | H06134866 A | 5/1994 |

(Continued)

*Primary Examiner* — Walter L Lindsay, Jr.
*Assistant Examiner* — Jessica L Eley
(74) *Attorney, Agent, or Firm* — Canon U.S.A., Inc. IP Division

(57) ABSTRACT

A manufacturing method of a cartridge, the cartridge being attachable to an apparatus main body of an image forming apparatus, the cartridge including a first member and a second member, the first member including a receiving surface and a retaining portion, and the second member including a contact surface in contact with the receiving surface. In the manufacturing method, the first member and the second member are held so that the contact surface covers the retaining portion and so that the contact surface and the receiving surface are in contact with each other and joined by ultrasonic spot welding so that a recess recessed towards the retaining portion is formed in the second member and so that at least part of a fused portion of the first member and the second member enters the retaining portion.

17 Claims, 18 Drawing Sheets

(56) References Cited

U.S. PATENT DOCUMENTS

2014/0321883 A1* 10/2014 Nakazawa ......... G03G 21/1676
399/119
2016/0070207 A1* 3/2016 Yada .................. G03G 15/0891
399/254

FOREIGN PATENT DOCUMENTS

| JP | H11268135 A | 10/1999 |
|----|-------------|---------|
| JP | 2005049762 A | 2/2005 |

* cited by examiner

MANUFACTURING METHOD OF CARTRIDGE AND CARTRIDGE

BACKGROUND OF THE INVENTION

Field of the Invention

The present disclosure relates to a cartridge being attachable to an apparatus main body of an image forming apparatus using an electrophotographic system and to a manufacturing method of the cartridge.

A cartridge includes developer, an electrophotographic photosensitive member, and components such as a processing member that acts on the electrophotographic photosensitive member. The cartridge is attached to an apparatus main body of an image forming apparatus.

The image forming apparatus includes an electrophotographic copying machine, an electrophotographic printer (LED printer, laser printer, and the like), a facsimile machine, and a word processor.

Description of the Related Art

In a case in which a cartridge attached to an image forming apparatus includes a plurality of members, a fastening member such as a screw may be used as a joining member that joins the plurality of members to each other.

As a method of joining the plurality of members included in the cartridge, a so-called ultrasonic welding that joins the members to each other with ultrasonic vibration is known. In ultrasonic welding, an ultrasonic vibrator that includes a resonance member that transmits ultrasonic vibration to a member by abutting against the member is used. As a method of ultrasonic welding, ultrasonic spot welding is known that uses a resonance member having a tip with a pointed shape.

In ultrasonic spot welding, the tip of the resonance member is abutted against one member and is moved towards the other member. In so doing, a fused portion in which the one member and the other member are melted is formed. Moreover, a recess recessed towards the other member is formed in the one member that has been melted by the resonance member abutting thereagainst.

Disclosed in Japanese Patent Laid-Open No. 2005-49762 is a cartridge that includes members that are joined together by ultrasonic spot welding and that is detachably attachable to the image forming apparatus.

In a case in which a plurality of members are joined to each other by ultrasonic spot welding, when a large amount of fused portion enters between one member and the other member, the members may become separated from each other.

SUMMARY OF THE INVENTION

The present disclosure provides a cartridge in which the amount of fused portion of the members entering a portion between one member and the other member when a plurality of members are joined by ultrasonic spot welding is reduced.

An aspect of the disclosure according to the present application is a manufacturing method of a cartridge, the cartridge being attachable to an apparatus main body of an image forming apparatus, and the cartridge including a first member and a second member, the first member including a receiving surface and a retaining portion, and the second member including a contact surface in contact with the receiving surface, the manufacturing method including holding the first member and the second member so that the contact surface covers the retaining portion and so that the contact surface and the receiving surface are in contact with each other, and joining the first member and the second member to each other by ultrasonic spot welding so that a recess recessed towards the retaining portion is formed in the second member and so that at least part of a fused portion of the first member and the second member enters the retaining portion.

Another aspect of the disclosure according to the present application is a cartridge being attachable to an apparatus main body of an image forming apparatus, the cartridge including a first member including a receiving surface and a retaining portion, and a second member including a contact surface in contact with the receiving surface, the second member being disposed so that the contact surface covers the retaining portion and so that the contact surface and the receiving surface are in contact with each other. In the cartridge, the first member and the second member are joined by ultrasonic spot welding so that a recess recessed towards the retaining portion is formed in the second member and so that at least part of a fused portion of the first member and the second member enters the retaining portion.

Further features of the present invention will become apparent from the following description of example embodiments with reference to the attached drawings.

DESCRIPTION OF THE EMBODIMENTS

Hereinafter, an example embodiment of the present disclosure will be exemplified with reference to the drawings. Note that in principle, the dimensions, the materials, and the shapes of the components, the relative configuration of the components, and the like that are described in the following example embodiment are to be appropriately altered based on the configuration of the device to which the present disclosure is applied and on various conditions, and the scope of the present disclosure is not intended to be limited by the following example embodiment.

Furthermore, a rotational axis of an image carrying member described later and a rotational axis of a developer carrying member that are described later in the present example embodiment are practically parallel to each other. Moreover, a longitudinal direction is practically the same as the direction in which the rotational axis of the image carrying member and the direction in which the rotational axis of the developer carrying member extend.

First Example Embodiment

Hereinafter, the example embodiment of the present disclosure will be described in detail with reference to the drawings. In the longitudinal direction, a side on which a photosensitive drum receives driving force from an image forming apparatus main body (apparatus main body) is referred to as a drive side, and a side opposite to the drive side is referred to as a non-drive side.

Overall Configuration of Electrophotographic Image Forming Apparatus

Figure 2:
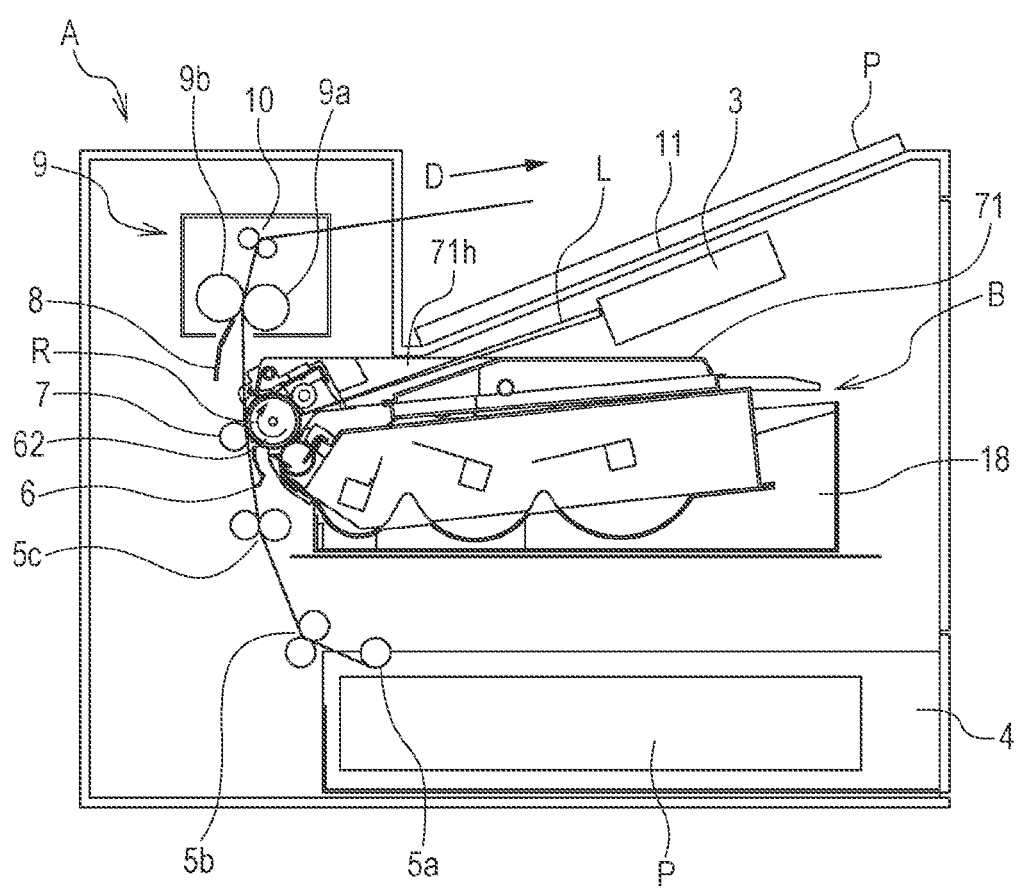
FIG. 2 is a cross-sectional view of an apparatus main body of an image forming apparatus and a cartridge according to the first example embodiment.

Referring to FIG. 2, an overall configuration of the image forming apparatus will be described.

FIG. 2 is a cross-sectional view of an apparatus main body A of the image forming apparatus and a cartridge B of the present example embodiment. Note that the apparatus main body A is a portion of the electrophotographic image forming apparatus in which the cartridge B has been excluded.

The image forming apparatus illustrated in FIG. 2 is a laser beam printer employing an electrophotographic system and is a laser beam printer in which the cartridge B is detachable from the apparatus main body A. The apparatus main body A includes and exposing device 3 (a laser scanner unit) that forms a latent image on a photosensitive drum 62 serving as an image carrying member. Furthermore, a sheet tray 4 that contains sheets of paper (hereinafter, referred to as sheet materials P) serving as the recoding materials is disposed below the cartridge B.

Furthermore, a pickup roller 5a, a pair of feed rollers 5b, a pair of conveyance rollers 5c, a transfer guide 6, a transfer roller 7, a conveyance guide 8, a fixing device 9, a pair of discharge rollers 10, a discharge tray 11, and other members are disposed in a conveying direction D of the sheet material P in the apparatus main body A. The fixing device 9 includes a heat roller 9a and a pressure roller 9b.

Overall Configuration of Cartridge

An overall configuration of the cartridge B will be described with reference to FIGS. 2 to 4B, and 10 to 13.

Figure 3:
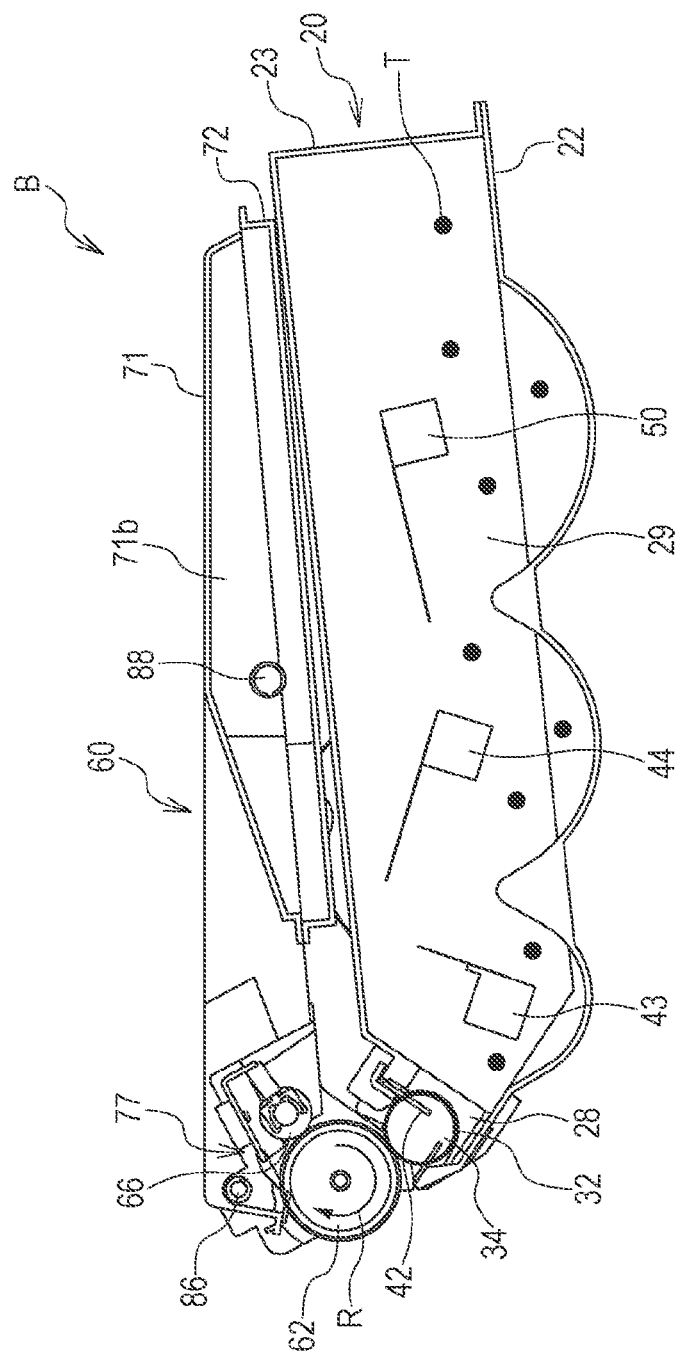
FIG. 3 is a cross-sectional view of the cartridge according to the first example embodiment.
Figure 4A:
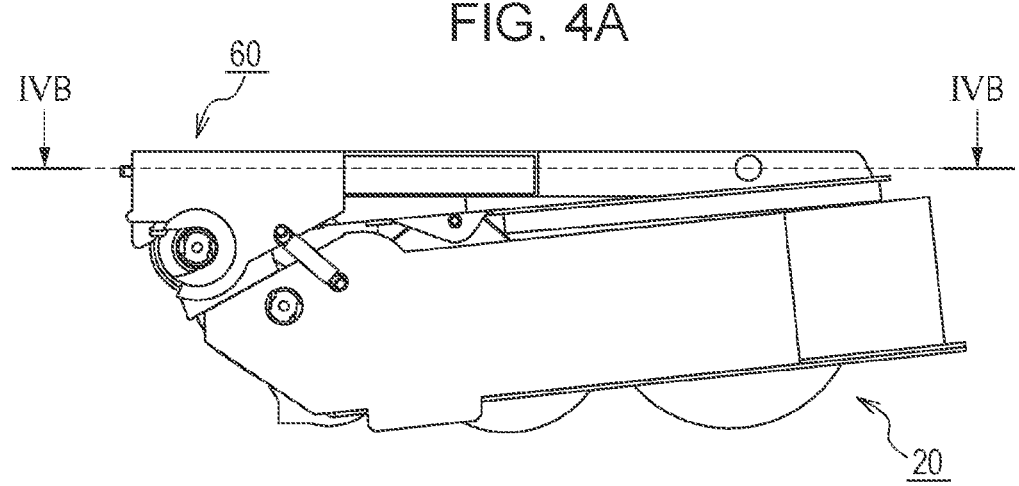
FIG. 4A is a side view of the cartridge and FIG. 4B is a cross-sectional view of a photoreceptor unit.
Figure 4B:
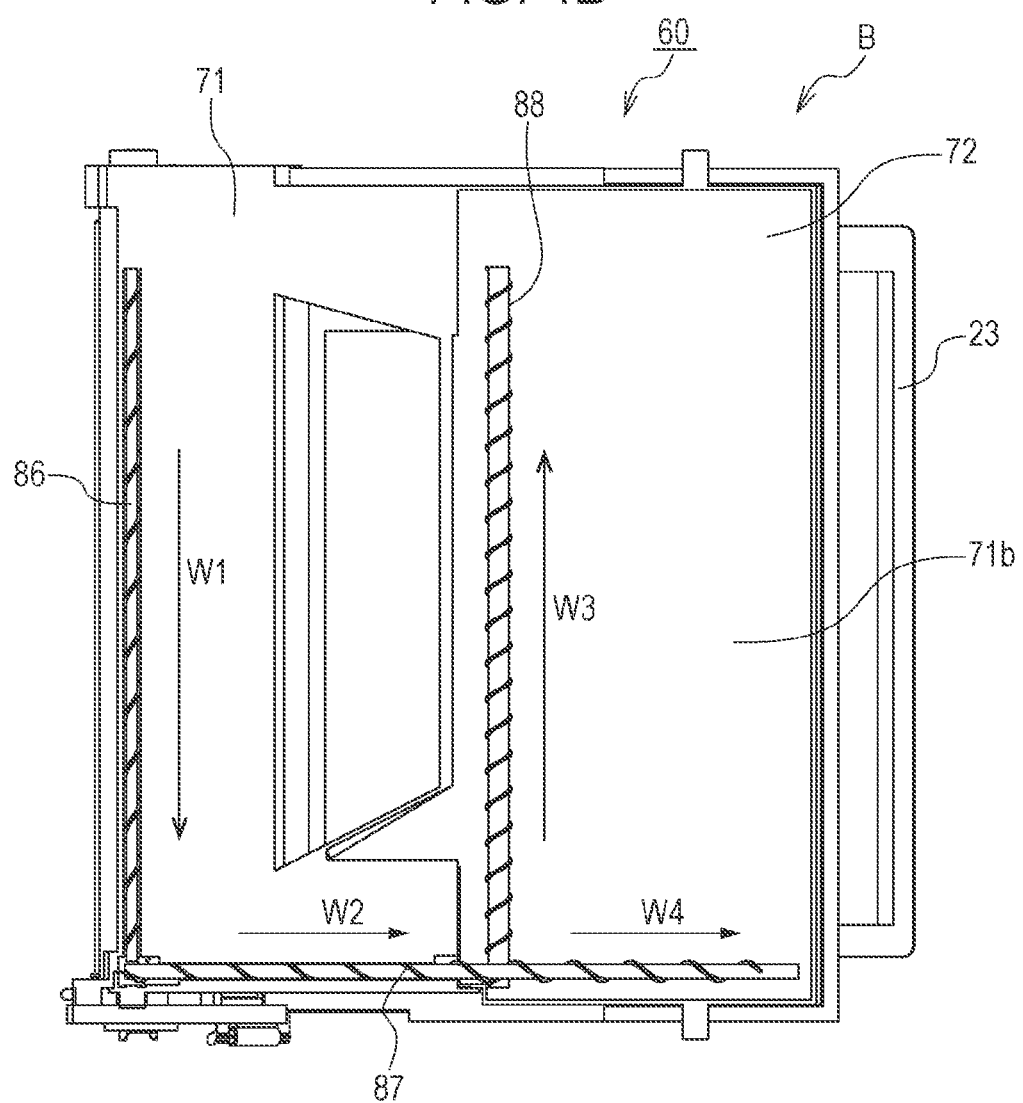
Figure 10:
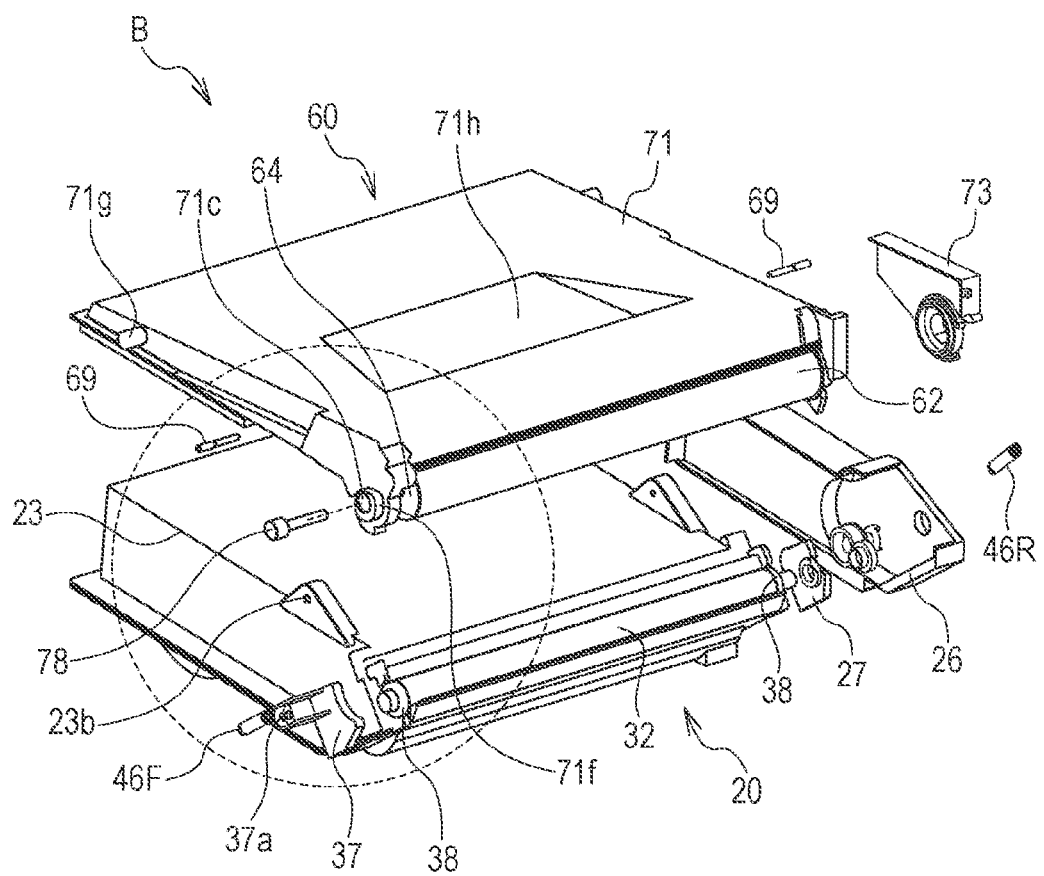
FIG. 10 is a perspective view illustrating a configuration of the cartridge according to the first example embodiment.
Figure 11:
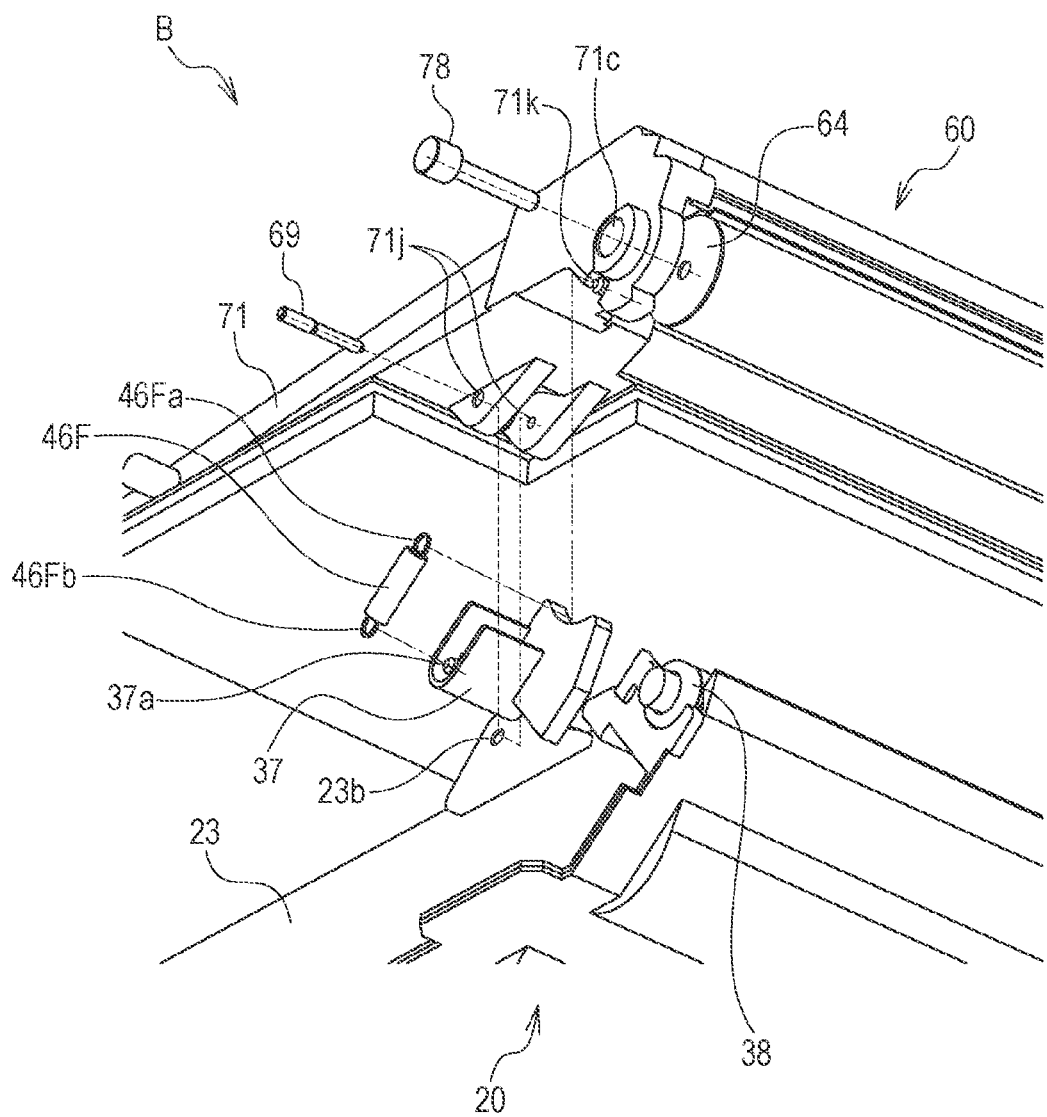
FIG. 11 is an enlarged view illustrating the configuration of the cartridge according to the first example embodiment.
Figure 12:
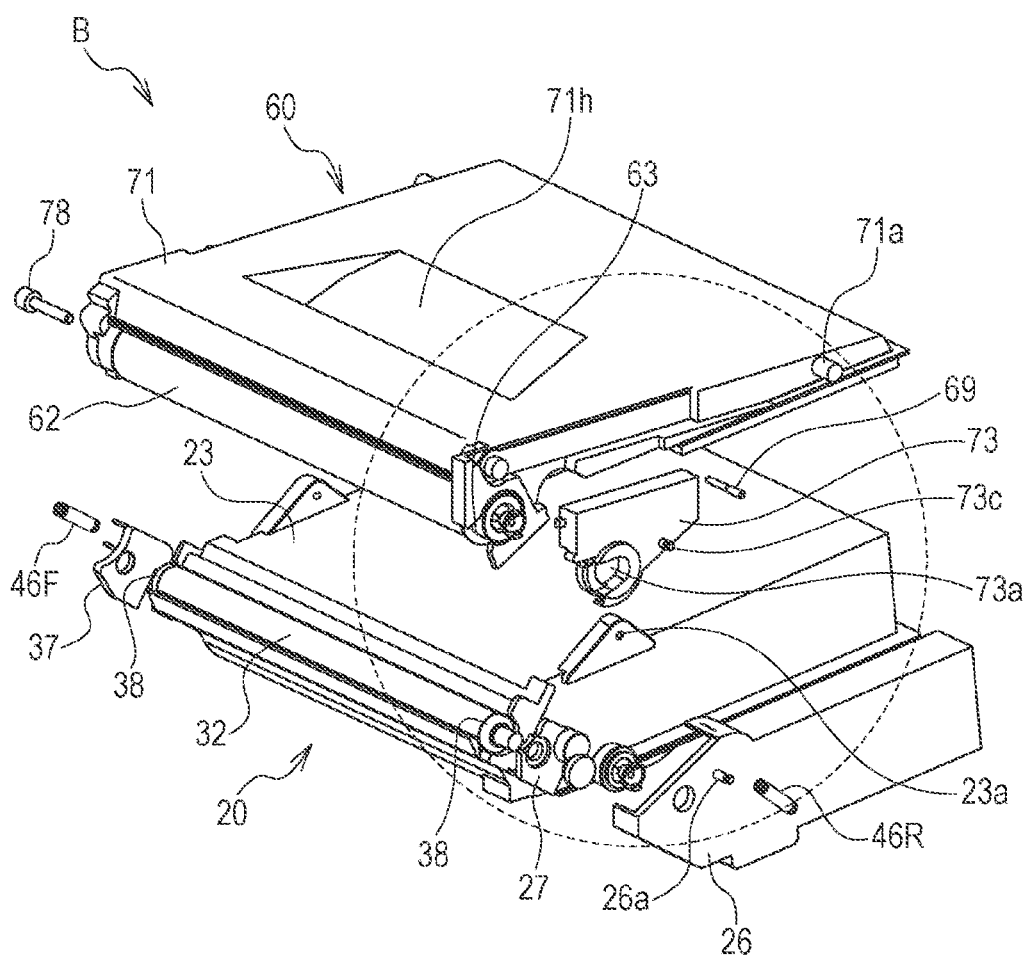
FIG. 12 is a perspective view illustrating the configuration of the cartridge according to the first example embodiment.
Figure 13:
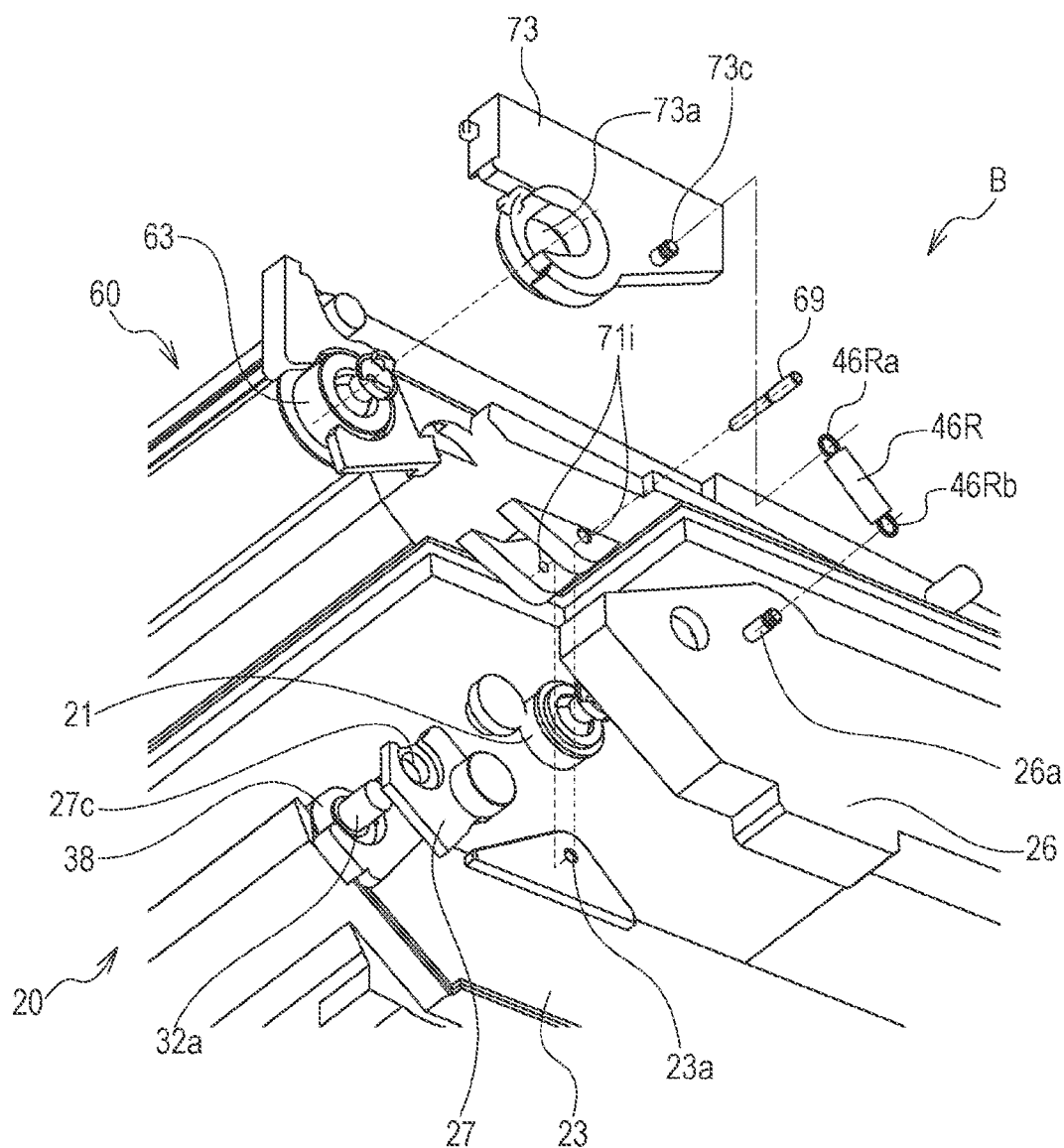
FIG. 13 is an enlarged view illustrating the configuration of the cartridge according to the first example embodiment.

FIG. 3 is a cross-sectional view of the cartridge B. FIG. 4A is a side view of the cartridge and FIG. 4B is a cross-sectional view of a photoreceptor unit. FIG. 4A is a side view of the cartridge B view in an axial direction of the photosensitive drum 62. FIG. 4B is a cross-sectional view of a photoreceptor unit 60 taken along line IVB-IVB in FIG. 4A. FIGS. 10 and 12 are perspective views illustrating a configuration of the cartridge B. FIGS. 11 and 13 are partially enlarged views of the portions inside the broken lines in FIGS. 10 and 12 viewed from angles different from those in FIGS. 10 and 12.

In the present example embodiment, the cartridge B includes the photoreceptor unit 60 and a developing unit 20.

As illustrated in FIG. 3, the photoreceptor unit 60 includes the photosensitive drum 62 serving as the image carrying member that carries an electrostatic latent image on a surface thereof. As illustrated in FIGS. 11 and 13, the photosensitive drum 62 includes a drive-side drum flange 63 on the drive side and a non-drive-side drum flange 64 on the non-drive side. As illustrated FIG. 3, the photoreceptor unit 60 includes a charge roller 66 serving as a charge member and a cleaning member 77 serving as a cleaning member that cleans a surface of the photosensitive drum 62. The photoreceptor unit 60 includes a drum frame 71 that supports the photosensitive drum 62, the charge roller 66, and the cleaning member 77. The charge roller 66 and the cleaning member 77 are each disposed in contact with an outer peripheral surface of the photosensitive drum 62.

As illustrated in FIGS. 3, 4A, and 4B, toner that has been removed from the surface of the photosensitive drum 62 with the cleaning member 77 is conveyed in a W1 direction with a first screw 86 serving as a removed toner conveying member and is passed on to a second screw 87. The toner that has been passed on to the second screw 87 is conveyed in a W2 direction. Some of the toner conveyed in the W2 direction is passed on to a third screw 88 and is conveyed in a W3 direction. The remaining toner is conveyed in a W4 direction with the second screw 87. Then, the removed toner is accumulated in a removed toner chamber 71b formed in the drum frame 71.

As illustrated in FIG. 3, the developing unit 20 includes a development roller 32 serving as the developer carrying member that develops an electrostatic latent image, and a development blade 42 serving as a layer thickness regulating member that regulates a thickness of a toner layer on the development roller 32. Moreover, the developing unit 20 includes a developer container 23 that supports the development roller 32 and the development blade 42 and that contains toner therein. A magnet roller 34 is provided inside the development roller 32. Space holding members (not shown) are attached to both ends of the development roller 32. The development roller 32 and the photosensitive drum 32 are held with a gap therebetween by having the space holding members abut against the photosensitive drum 62.

A first conveying member 43, a second conveying member 44, and a third conveying member 50 are provided in the toner chamber 29 formed by the developer container 23 and the developing-unit bottom member 22. The first conveying member 43, the second conveying member 44, and the third conveying member 50 not only stir the toner accommodated inside the toner chamber 29 but also convey the toner to the toner supply chamber 28 in which the development roller 32 is provided.

As illustrated in FIGS. 3, 11, and 13, the photoreceptor unit 60 is provided with the drum frame 71, a lid member 72, the photosensitive drum 62, and a drum bearing 73 and a drum shaft 78 that rotatably support the photosensitive drum 62. As illustrated in FIG. 13, the drive-side drum flange 63 is rotatably supported by a drum-unit sliding portion 73a of the drum bearing 73. Meanwhile, as illustrated in FIG. 11, the drum shaft 78 is press-fitted into a drum shaft support hole 71c provided in the drum frame 71, and the drum shaft 78 is inserted in the non-drive-side drum flange 64. The non-drive-side drum flange 64 is rotatably supported by the drum shaft 78.

As illustrated in FIGS. 3, 10, 12, and 13, the development roller 32 is rotatably attached to the developer container 23 through the bearing members 27 and 37 provided at both ends of the development roller 32. As illustrated in FIG. 13, a shaft 32a of the development roller 32 slides against a development roller sliding portion 27c provided in the bearing member 27. The bearing member 37 also includes a slide surface (not shown) that supports the shaft 32a. Moreover, a drive side lateral member (hereinafter, referred to as a side cover) 26 is provided on the outer side of the bearing member 27 in the longitudinal direction. The side cover 26 is joined to the developer container 23 by ultrasonic spot welding. Details will be described later.

As illustrated in FIGS. 11 and 13, the cartridge B is formed by pivotably connecting the photoreceptor unit 60 and the developing unit 20 to each other with connecting pins 69.

Specifically, at the end portions of the developing unit 20 in the longitudinal direction, a first support hole 23a and a second support hole 23b are provided in the developer container 23. Furthermore, at each end portion of the photoreceptor unit 60 in the longitudinal direction, first suspension holes 71i and second suspension holes 71j are provided in the drum frame 71. By having the connecting pins 69 press-fitted and fixed in the first suspension holes 71i and the second suspension holes 71j fit into the first support hole 23a and the second support hole 23b, the photoreceptor unit 60 and the developing unit 20 are pivotably connected to each other.

Furthermore, a first hole portion 46Ra of a drive-side urging member 46R is hooked on a boss 73c of the drum bearing 73, and a second hole portion 46Rb is hooked on a boss 26a of the side cover 26.

Furthermore a first hole portion 46Fa of a non-drive-side urging member 46F is hooked on a boss 71k of the drum frame 71, and a second hole portion 46Fb is hooked on a boss 37a of the bearing member 37.

In the present example embodiment, the drive-side urging member 46R and the non-drive-side urging member 46F are tension springs. By urging the developing unit 20 against the photoreceptor unit 60 with the urging force of the springs, the development roller 32 is biased towards the photosensitive drum 62. Furthermore, the developing roller 32 is held so as to form a predetermined space with the photosensitive drum 62 with space holding members 38 attached to the two end portions of the developing roller 32.

Image Forming Process

Referring next to FIGS. 2 and 3, an outline of the image forming process will be described.

Based on a print start signal, the photosensitive drum 62 is rotationally driven in an arrow R direction at a predetermined speed (FIG. 2).

The charge member (the charge roller) 66 to which a voltage has been applied comes in contact with the outer peripheral surface of the photosensitive drum 62 and charges the outer peripheral surface of the photosensitive drum 62.

The exposure device 3 outputs a laser beam L according to image information. The laser beam L passes through a laser opening 71H provided in the drum frame 71 of the cartridge B and exposes the outer peripheral surface of the photosensitive drum 62. With the above, an electrostatic latent image according to the image information is formed on the outer peripheral surface of the photosensitive drum 62.

Meanwhile, as illustrated in FIG. 3, in the developing unit 20 serving as a developing device, toner T inside the toner chamber 29 is conveyed by rotation of the first conveying member 43, the second conveying member 44, and the third conveying member 50, and is sent out to the toner supply chamber 28. The toner T is carried on a surface of the developing roller 32 with magnetic force of the magnet roller 34 (a stationary magnet). While the toner T is triboelectrically charged, the thickness of the toner T on the peripheral surface of the developing roller 32 is restricted with the developing blade 42. The toner carried on the surface of the development roller 32 is conveyed by the rotation of the development roller 32.

A predetermined development voltage is applied to the development roller 32. With the potential difference between the photosensitive drum 62 and the development roller 32, the toner T is developed on the photosensitive drum 62 according to the electrostatic latent image. The electrostatic latent image is visualized as a toner image. The toner carried on the photosensitive drum 62 is conveyed by the rotation of the photosensitive drum 62.

Figure 8:
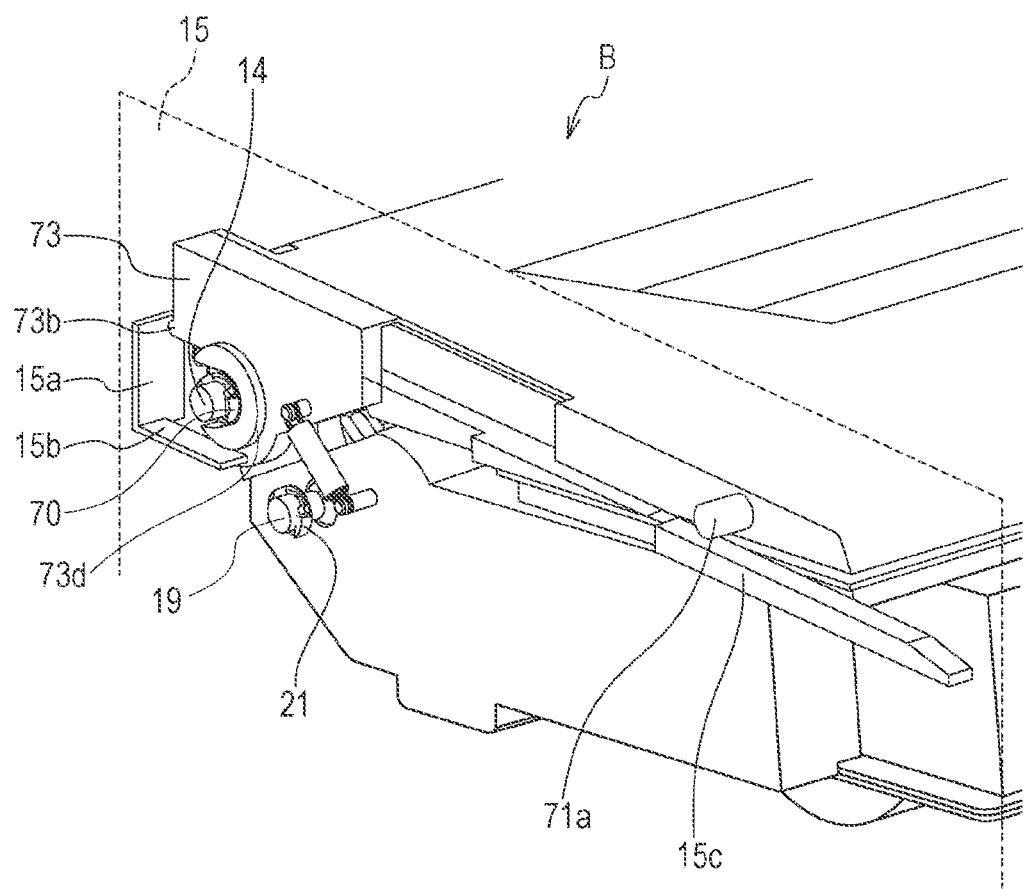
FIG. 8 is a perspective view illustrating a support of the cartridge according to the first example embodiment.

Note that a first drive shaft 14 and a second drive shaft 19 that transmit the drive to the a first coupling 70 and a second coupling 21 provided in the cartridge B are provided in the apparatus main body A (FIG. 8). The first drive shaft 14 and the second drive shaft 19 are driven with a motor (not shown) of the apparatus main body A. With the above, the photosensitive drum 62 connected to the first coupling 70 is rotated by receiving driving force from the apparatus main body A. Furthermore, the development roller 32 is rotated by having drive transmitted from the second coupling 21. Moreover, power is supplied to the charge roller 66 and the development roller 32 from a power supply unit (not shown) of the main body A of the apparatus.

Meanwhile, as illustrated in FIG. 2, the sheet material P contained in the sheet tray 4 below the apparatus main body A is sent out with the pickup roller 5a, the pair of feed rollers 5b, the pair of conveyance rollers 5c. Subsequently, the sheet material P passing through the transfer guide 6 is conveyed to a transfer position between the photosensitive drum 62 and the transfer roller 7. The toner image is transferred from the photosensitive drum 62 to the sheet member P at the transfer position.

The sheet material P to which the toner image has been transferred is separated from the photosensitive drum 62 and is conveyed along the conveyance guide 8 to the fixing device 9. Subsequently, the sheet material P passes through a nip portion between the heat roller 9a and the pressure roller 9b included in the fixing device 9, and the toner image is fixed to the sheet material P. The sheet material P is conveyed to the pair of discharge rollers 10 and is discharged on a discharge tray 11.

Meanwhile, as illustrated in FIG. 3, the residual toner on the outer peripheral surface of the photosensitive drum 62 after the transferring is removed by the cleaning member 77 and the photosensitive drum 62 is used once more in the image forming process. The toner removed from the photosensitive drum 62 is stored in the removed toner chamber 71b of the photoreceptor unit 60.

The charge roller 66, the developing roller 32, the transfer roller 7, the cleaning member 77 that have been described above are process members that act on the photosensitive drum 62.

Attachment and Detachment of Cartridge

Figure 5:
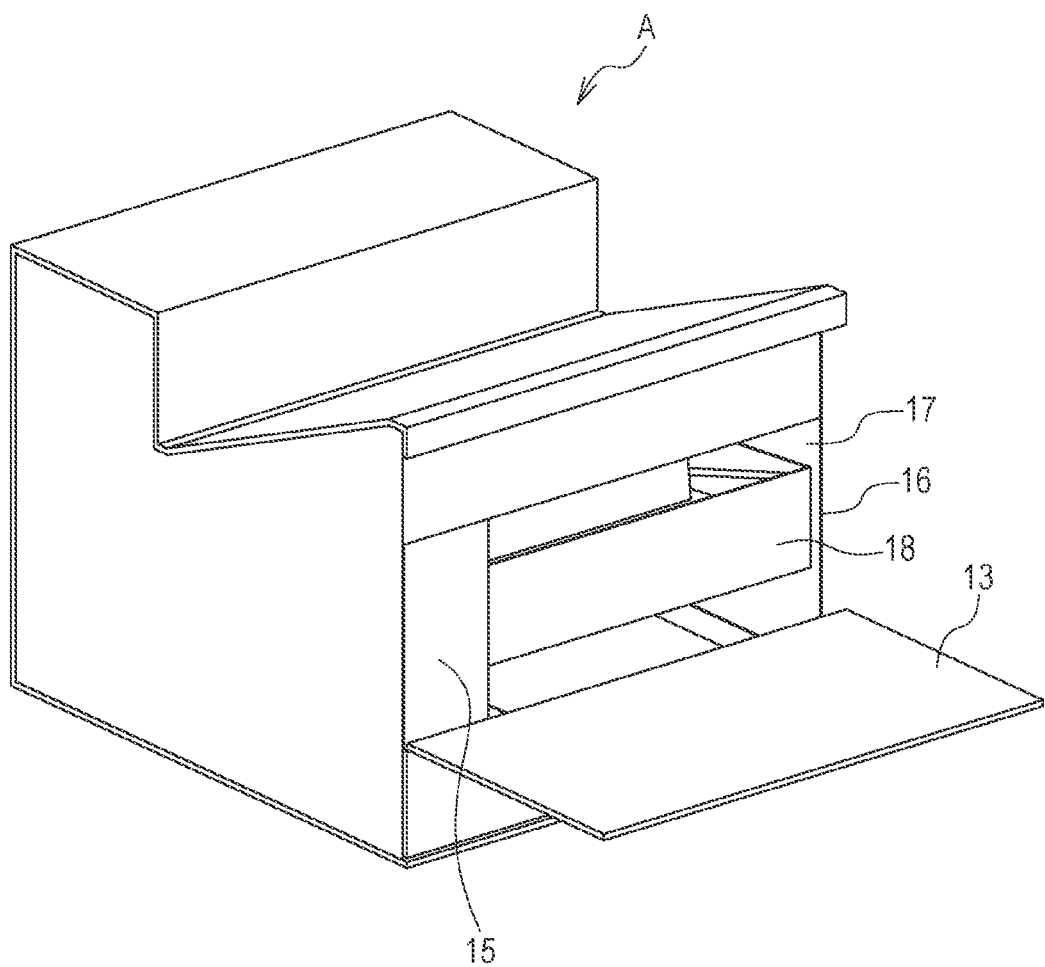
FIG. 5 is a perspective view of an image forming apparatus main body in which an openable/closable door of an electrophotographic image forming apparatus is open.
Figure 6:
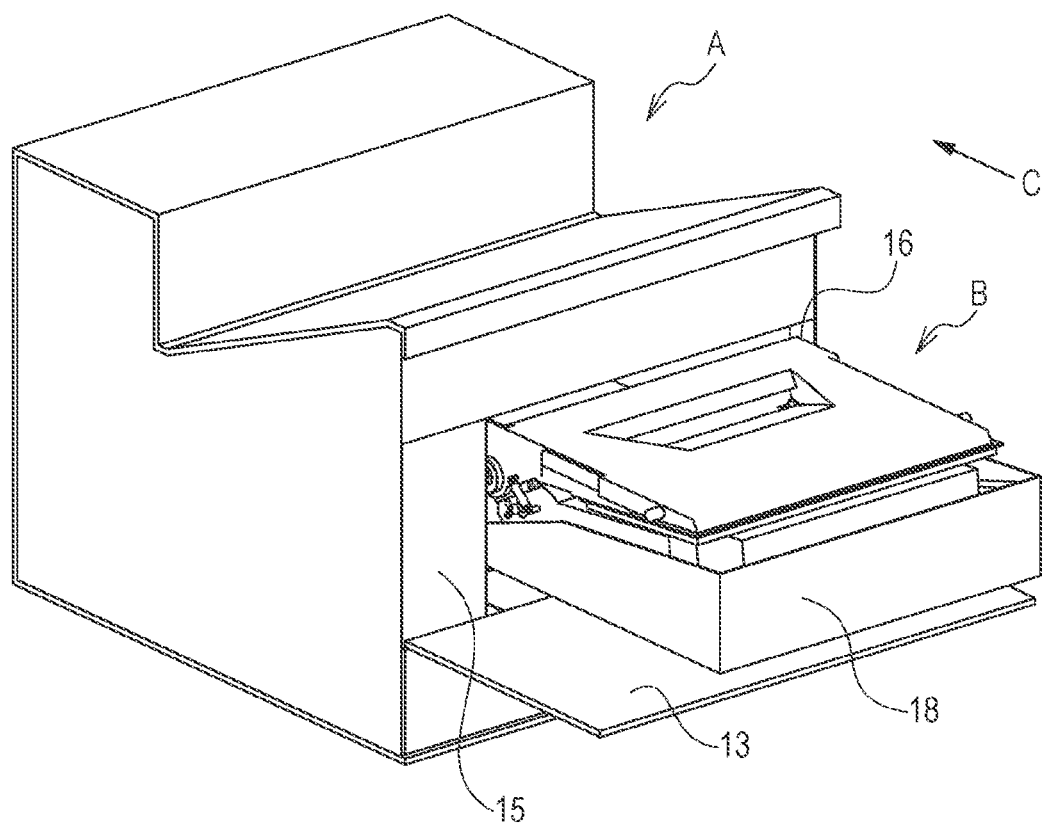
FIG. 6 is a perspective view of the apparatus main body according to the first example embodiment in a state in which the openable/closable door is open and a tray has been drawn out.
Figure 7:
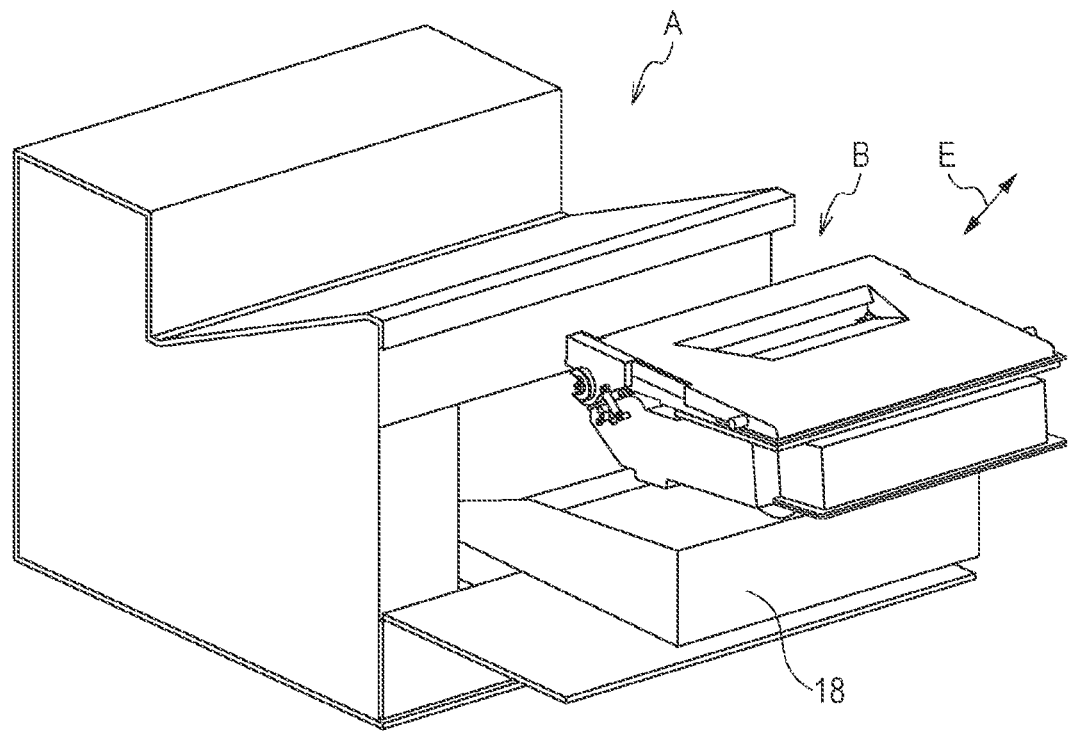
FIG. 7 is a perspective view of the apparatus main body and the cartridge according to the first example embodiment when the cartridge is attached/detached from the tray while in a state in which the openable/closable door is open and the tray has been drawn out.

Referring next to FIGS. 5, 6, and 7, attachment and detachment of the cartridge B with respect to the apparatus main body A will be described.

FIG. 5 is a perspective view of the apparatus main body A in which an openable/closable door 13 is open for attaching and detaching the cartridge B. FIG. 6 is a perspective view of the apparatus main body A and the cartridge B in a state in which the openable/closable door 13 is open and a tray 18 has been drawn out to attach/detach the cartridge B. FIG. 7 is a perspective view of the apparatus main body A and the cartridge B in a state in which the openable/closable door 13 is open and the tray 18 has been drawn out and while the cartridge B is being attached/detached. The cartridge B is detachably attachable in an attaching and detaching direction E with respect to the tray 18.

The openable/closable door 13 is attached to the main body A of the apparatus in a pivotal manner. When the openable/closable door 13 is opened, a cartridge insertion port 17 becomes exposed. The tray 18 for mounting the cartridge B in the apparatus main body is provided in the cartridge insertion port 17. The cartridge B can be attached/detached when the tray 18 is drawn out to a predetermined position. In a state in which the cartridge B is mounted on the tray 18, the cartridge B is mounted in the apparatus main body A in an arrow C direction in the drawing along guide rails (not shown).

Cartridge Support

Figure 9:
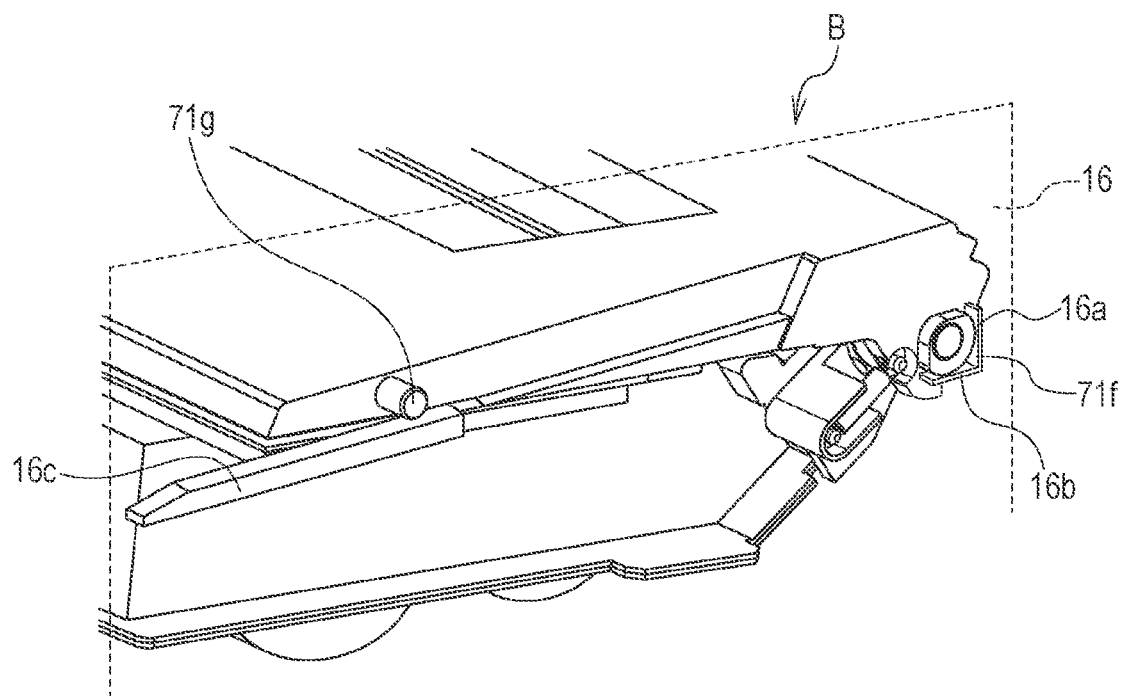
FIG. 9 is a perspective view illustrating a support of the cartridge according to the first example embodiment.

Referring to FIGS. 5, 8, and 9, a support mechanism of the cartridge B will be described.

FIG. 8 is a diagram illustrating a support mechanism of the cartridge on the drive side. FIG. 9 is a diagram illustrating a support mechanism of the cartridge on the non-drive side.

As illustrated in FIG. 5, the apparatus main body A is provided with a drive side plate 15 and a non-drive side plate 16 that support the cartridge B. As illustrated in FIGS. 8 and 9, the drive side plate 15 is provided with a first supporting portion 15a, a second supporting portion 15b, and a rotation regulating portion 15c that regulates the rotation of the cartridge B. The non-drive side plate 16 is provided with a first supporting portion 16a, a second supporting portion 16b, and a rotation regulating portion 16c that regulates the rotation of the cartridge B.

A supported portion 73b and a supported portion 73d are provided in the drum bearing 73 of the cartridge B. A regulated portion 71a is provided on the drive side of the drum frame 71 and a supported portion 71f and a regulated portion 71g are provided on the non-drive side.

The supported portion 73b abuts against the first supporting portion 15a. The supported portion 73d abuts against the second supporting portion 15b. The regulated portion 71a abuts against the rotation regulating portion 15c. The supported portion 71f abuts against the first supporting portion 16a and the second supporting portion 16b. The regulated portion 71g abuts against the rotation regulating portion 16c. With the above, the position of the cartridge B with respect to the apparatus main body A is set inside the apparatus main body A.

Ultrasonic Spot Welding

A method of joining by ultrasonic spot welding used in the present disclosure will be described. Ultrasonic spot welding is one of the methods of joining two members using an ultrasonic wave.

In ultrasonic welding, an oscillator that generates an ultrasonic vibration, and a resonance member that is attached to the oscillator and that transmits the ultrasonic vibration to other members are used. The resonance member is referred to as a horn or a welding horn. A certain amount of pressure is applied to the members with the welding horn to apply ultrasonic vibration thereto. With the above, frictional heat is generated in resin of the two members. The above frictional heat melts the resin of the two members and joins the resin of the two members to each other.

The materials of the members joined to each other by ultrasonic welding desirably include thermoplastic resin. Furthermore, in order to increase the joining strength between the two members, the materials of the two members, at least at the melted portions, are compatible to each other. More desirably, the materials of the two members are the same. In the present example embodiment, styrenic thermoplastic resin having the same material quality is used as the material of the developer container 23 serving as a first member and the material of the side cover 26 serving as a second member that are described later.

Figure 18:
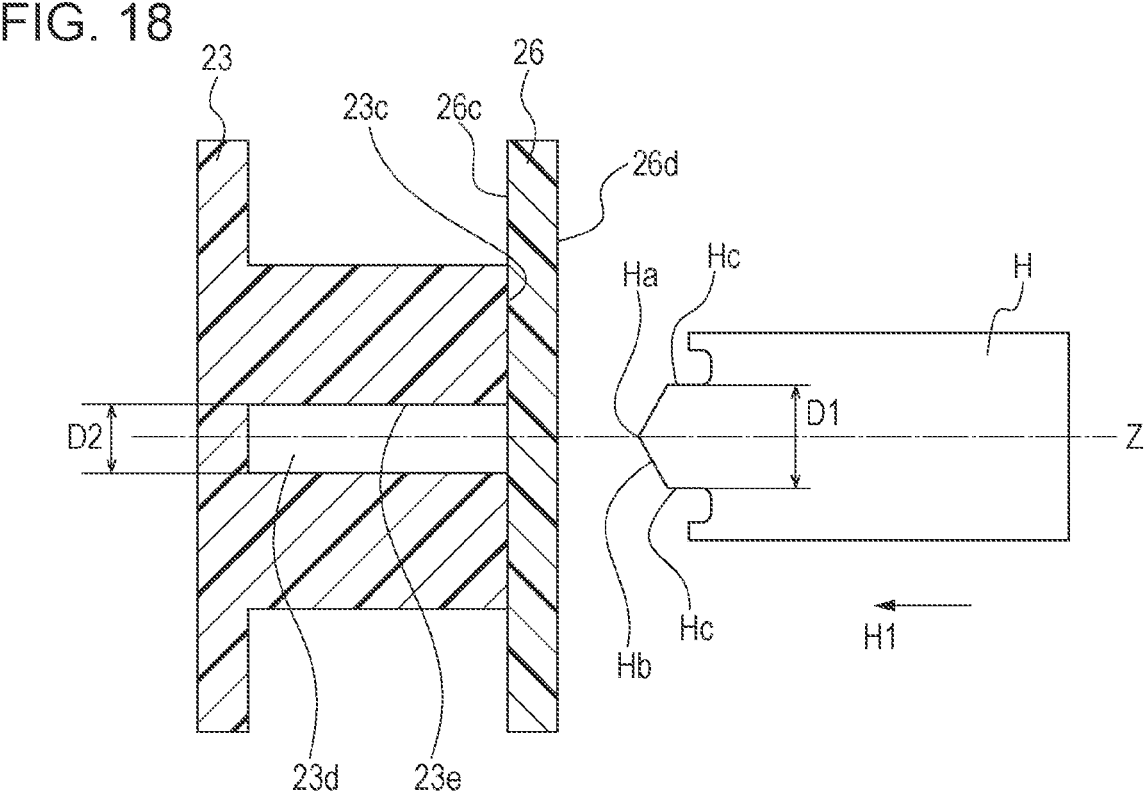
FIG. 18 is a cross-sectional view illustrating joining by ultrasonic spot welding according to the first example embodiment.

The welding horn used in ultrasonic spot welding will be described. As illustrated in FIG. 18, a welding horn H includes a cylindrical portion Hc having a diameter D1, and a tapered portion Hb in which a diameter thereof becomes smaller from the cylindrical portion towards a horn tip portion Ha. In other words, in the welding horn, the horn tip portion Ha has a pointed shape. By using a welding horn having such a tip shape, the members can be joined to each other without the need of forming, in the joined member, a protruded shape (a so-called ultrasonic joint) that transmits the ultrasonic wave.

Joining Side Cover and Developer Container by Ultrasonic Spot Welding

In the present example embodiment, the side cover 26 serving as the second member is joined to the developer container 23 serving as the first member by ultrasonic spot welding.

Joining of the side cover 26 to the developer container 23 by ultrasonic spot welding will be described with reference to FIGS. 1 and 14 to 22.

Figure 14:
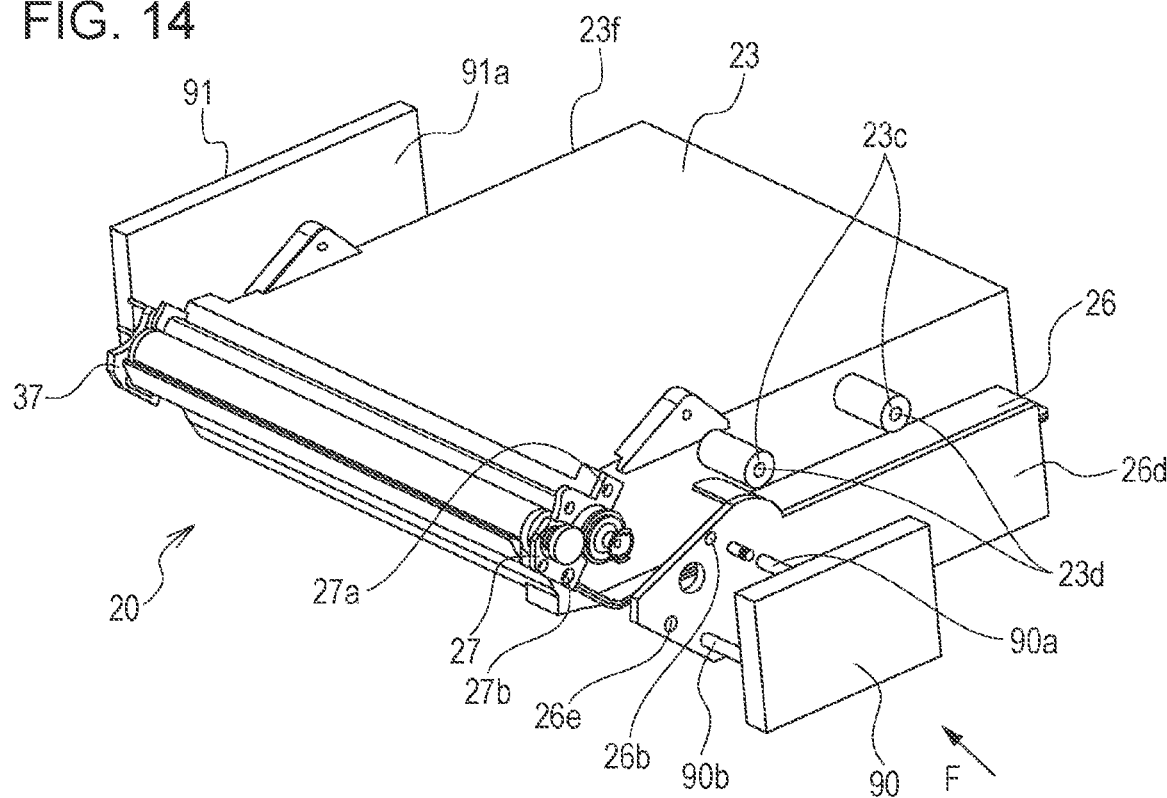
FIG. 14 is a perspective view illustrating a developing unit according to the first example embodiment.
Figure 15:
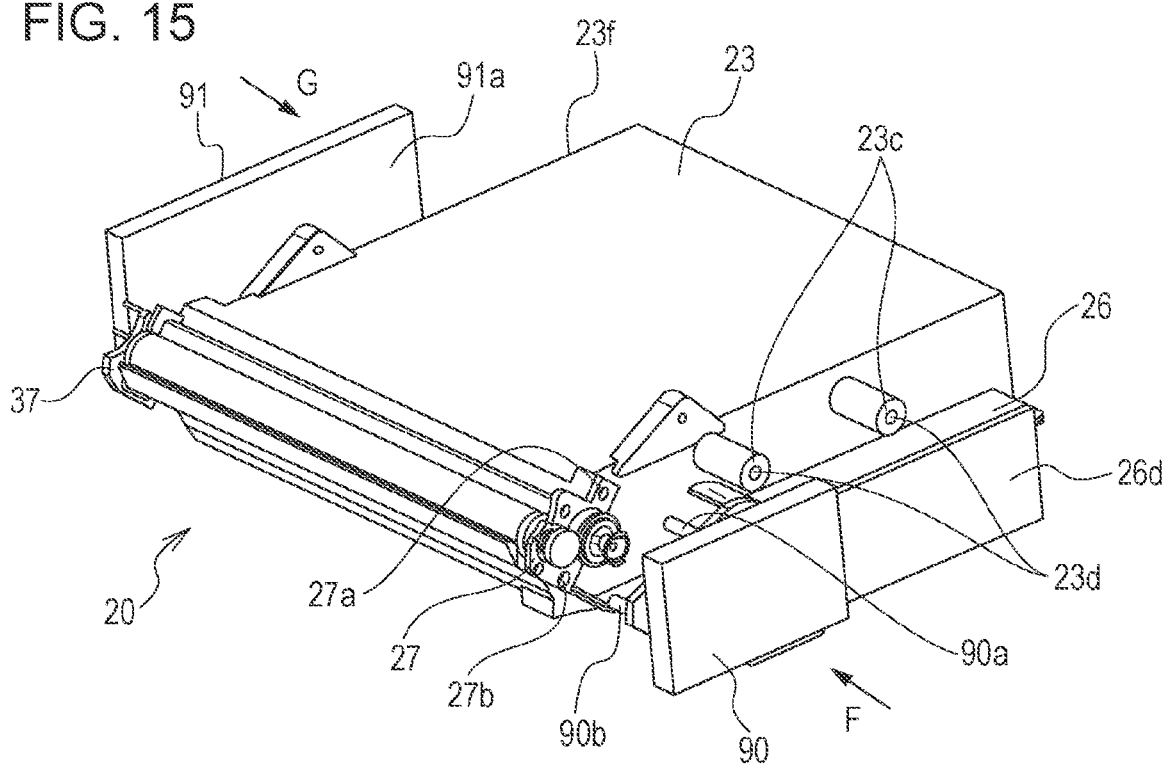
FIG. 15 is a perspective view illustrating a developing unit according to the first example embodiment.
Figure 16:
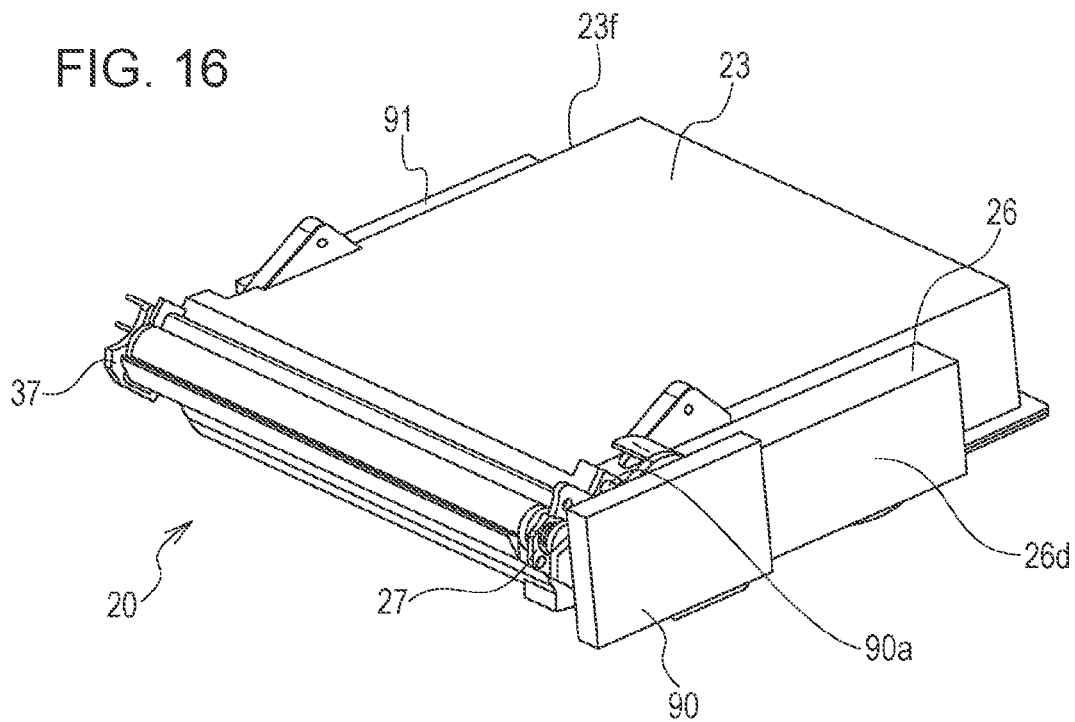
FIG. 16 is a perspective view illustrating a developing unit according to the first example embodiment.
Figure 17:
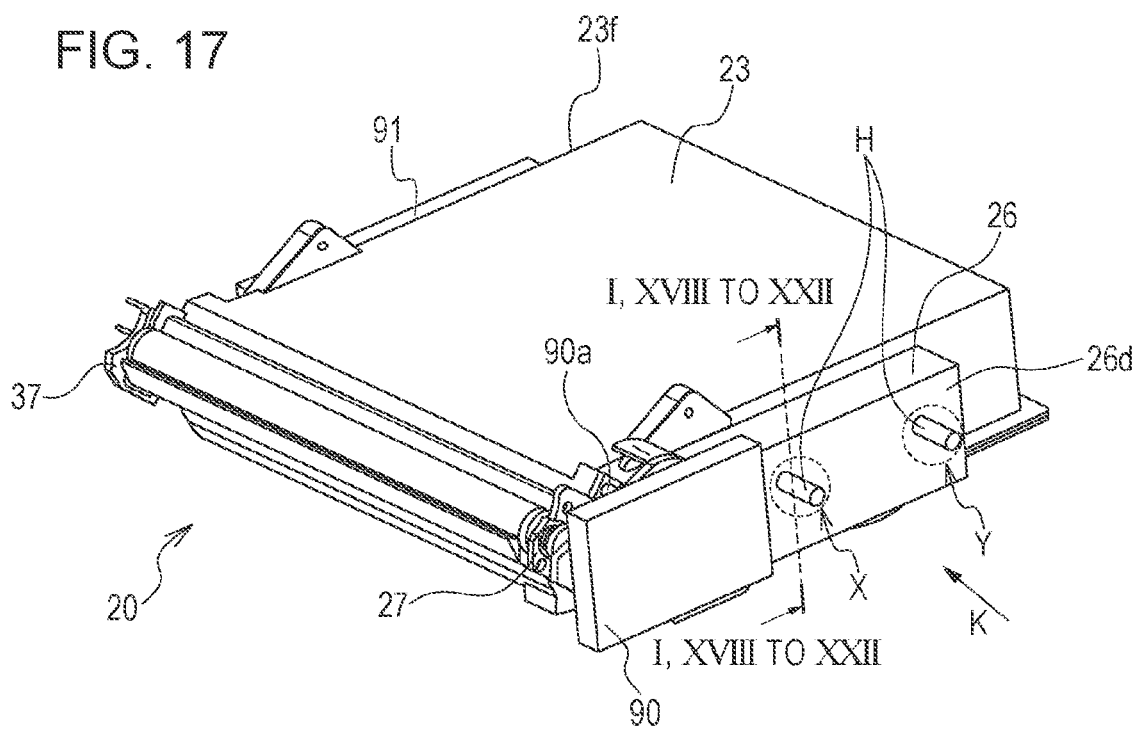
FIG. 17 is a perspective view illustrating joining by ultrasonic spot welding according to the first example embodiment.

FIGS. 14 to 16 are perspective views illustrating a positioning process of the side cover 26 and the developer container 23. FIG. 17 is a perspective view illustrating a process of joining the side cover 26 and the developer container 23 to each other by ultrasonic spot welding. FIGS. 1 and 18 to 22 are cross-sectional views illustrating the process of joining the side cover 26 and the developer container 23 by ultrasonic spot welding.

FIGS. 1 and 18 to 22 are drawings of cross sections each taken along a line that are orthogonal to a first contact surface 23c described later and a normal line that passes the center of a retaining hole portion 23d and are drawings each viewed in a direction orthogonal to the cross section.

Holding Step

A manufacturing method of the cartridge B includes a holding step in which the side cover 26 and the developer container 23 are held at positions at which ultrasonic spot welding are performed. Hereinafter, the holding step will be described.

As illustrated in FIGS. 14 and 18, the developer container 23 includes first contact surfaces 23c serving as receiving surfaces. Furthermore, the first contact surfaces 23c are provided with retaining hole portions 23d serving as retaining portions. In other words, the retaining portions are recesses that are each recessed in a direction intersecting (in an orthogonal direction in the present example embodiment) the corresponding first contact surface 23c and are holes that each have a diameter D2 in the present example embodiment.

In the present example embodiment, the first contact surfaces 23c are oriented in the longitudinal direction. In other words, the first contact surfaces 23c are surfaces that intersect (orthogonal to, in the present example embodiment) the longitudinal direction.

The first contact surfaces 23c in which the retaining hole portions 23d are provided are provided at a plurality of positions in the developer container 23. In the present example embodiment, the number of first contact surfaces 23c provided with the retaining hole portions 23d is two. However, the number of first contact surfaces 23c provided with the retaining hole portions 23d may be one. A reference hole 27a and a long hole 27b described later are provided in the bearing member 27 fixed to the developer container 23.

The side cover 26 includes a second contact surface 26c serving as a contact surface in contact with the first contact surfaces 23c. In a state in which ultrasonic spot welding is performed on the side cover 26 and the developer container 23, the second contact surface 26c configured so as to be situated along and in contact with the first contact surfaces 23c. Moreover, a reference hole 26b and a long hole 26e described later are provided in the side cover 26.

As illustrated in FIG. 14, the side cover 26 and a holding member 90 used in installing the side cover 26 are disposed on one end side of the developer container 23 in the longitudinal direction. Furthermore, a backup member 91 is disposed on the other end side of the developer container 23 in the longitudinal direction. The holding member 90 includes shafts 90a and 90b fitted in the reference hole 26b and the long hole 26e of the side cover 26.

When the holding member 90 is moved in an arrow F direction in FIG. 14, the shafts 90a and 90b fit into the reference hole 26b and the long hole 26e. With the above, as illustrated in FIG. 15, the side cover 26 is held by the holding member 90.

While holding the side cover 26, the holding member 90 moves in the arrow F direction in FIG. 15. At the same time, backup member 91 also moves in an arrow G direction in FIG. 15. In so doing, as illustrated in FIG. 15, the reference hole 27a and the long hole 27b of the bearing member 27 and the shafts 90a and 90b of the holding member 90, respectively, are fitted to each other. In other words, the developer container 23 is held by the holding member 90 with the bearing member 27 interposed therebetween. With the above, the positions of the developer container 23 and the side cover 26 in a direction intersecting the longitudinal direction are set. Meanwhile, in the backup member 91, a surface 91a abuts against a contacted surface 23f of the developer container 23.

Moreover, the developer container 23 and the side cover 26 are moved to positions at which the first contact surfaces 23c and the second contact surface 26c of the side cover 26 abut against each other. With the above, as illustrated in FIG. 16, the developer container 23 and the side cover 26 are held at positions (holding positions) at which the ultrasonic spot welding is performed. As illustrated in FIG. 18, in a state in which the developer container 23 and the side cover 26 are held at the holding positions, the first contact surfaces 23c and the second contact surface 26c are in contact with each other. Furthermore, the retaining hole portions 23d are covered by the second contact surface 26c. In the present example embodiment, the first contact surfaces 23c and the second contact surface 26c are flat surfaces formed parallel to each other at the holding positions. The first contact surfaces 23c and the second contact surface 26c are, desirably, flat surfaces that abut against each other at least at the circumferences (rim portions) of the retaining hole portions 23d. However, the first contact surfaces 23c and the second contact surface 26c do not have to be perfectly flat surfaces or perfectly parallel to each other. For example, at least either of the first contact surfaces 23c and the second contact surface 26c may be deformed by the holding member 90 so that the first contact surfaces 23c and the second contact surface 26c abut against each other.

The position of the side cover 26 with respect to the bearing member 27 and the developer container 23 is set in the above manner and the side cover 26 is held at the position in which ultrasonic spot welding is performed.

Joining Step

The manufacturing method of the cartridge B includes a joining step in which the side cover 26 and the developer container 23 held at the holding positions in the holding step described above are joined to each other by ultrasonic spot welding. Hereinafter, the joining step will be described.

As illustrated in FIG. 18, the welding horn H is disposed outside of the side cover 26. The welding horn H moves in an arrow H1 direction (a horn entering direction H1) in FIG. 18. In the present example embodiment, the welding horn H moves in a direction intersecting the first contact surfaces 23c (desirably, a direction normal to the first contact surfaces 23c). The horn tip portion Ha of the welding horn H abuts against an opposing surface 26d of the side cover 26. The opposing surface 26d is a surface that is on the opposite side (on the back surface side) of the second contact surface 26c and is a surface that is parallel to the second contact surface 26c. In other words, the welding horn H moves from the side cover 26 side towards the developer container 23 side so that the side cover 26 is melted towards the retaining hole portions 23d of the first contact surfaces 23c.

The side cover 26 and the developer container 23 are joined to each other at two positions, namely, weld positions X and Y. Since the weld positions X and Y have the same configuration, the welded position X will be described in the following description. Furthermore, FIGS. 1, 18, 19, 20, 21, and 22 are cross-sectional views of the welded position X taken along lines I-I, XVIII-XVIII, XVIIII-XVIIII, XX-XX, XI-XI, and XXII-XXII, respectively, (see FIG. 17), and are cross-sectional views illustrating only the portions related to the joining performed by ultrasonic spot welding.

A method of joining the side cover 26 to the developer container 23 by ultrasonic spot welding will be described step-by-step with reference to FIGS. 1 and 18 to 22.

As illustrated in FIG. 18, the welding horn H includes a cylindrical portion Hc having a diameter D1, and the tapered portion Hb in which the diameter thereof becomes smaller from the cylindrical portion towards the horn tip portion Ha. Furthermore, the second contact surface 26c abuts against the first contact surface 23c. Note that the center axis Z of the cylindrical portion Hc passes through the horn tip portion Ha. Moreover, the direction of the center axis Z is the same as the horn entering direction H1.

Note that the direction of the center axis Z is parallel to a line normal to the first contact surface 23c. Furthermore, the direction of the center axis Z is parallel to a line normal to the second contact surface 26c. Furthermore, the center axis Z passes the center of the retaining hole portion 23d. In other words, the center axis Z is orthogonal to the first contact surface 23c or the second contact surface 26c and coincides with a normal line passing through the center of the retaining hole portion 23d.

A positional relationship between the welding horn H and the retaining hole portion 23d when the horn tip portion Ha abuts against the opposing surface 26d of the side cover 26 will be described. When viewed in the direction normal to the first contact surface 23c, the horn tip portion Ha is disposed so as to overlap the retaining hole portion 23d. In other words, in a direction normal to the first contact surface 23c (same as the direction normal to the second contact surface 26c), the position of the retaining hole portion 23d and the position of the horn tip portion Ha overlap each other. In other words, the horn tip portion Ha abuts against the opposing surface 26d in an area formed when the retaining hole portion 23d is projected on the opposing surface 26d in the direction normal to the first contact surface 23c. In other words, the horn tip portion Ha is disposed so that the line orthogonal to the first contact surface 23c and that passes through the horn tip portion Ha passes through the retaining hole portion 23d.

Note that the relationship between a diameter D1 of the cylindrical portion He of the welding horn H and a diameter D2 of the retaining hole portion 23d satisfies D1>D2.

Figure 19:
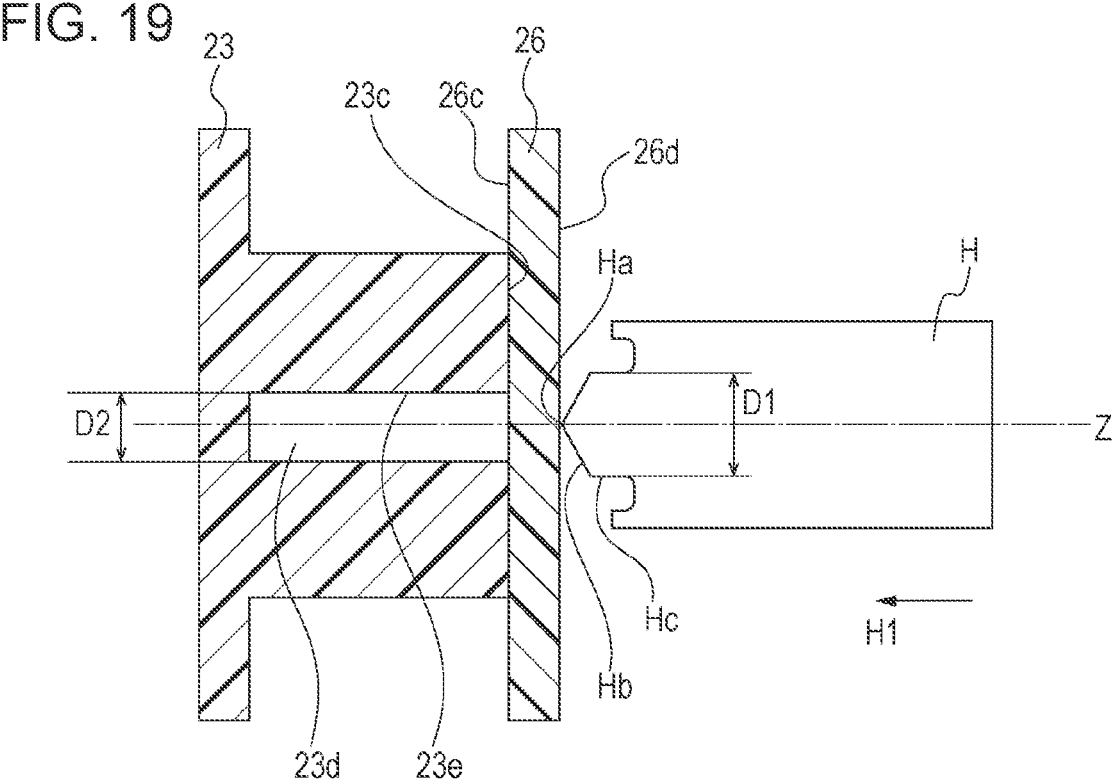
FIG. 19 is a cross-sectional view illustrating joining by ultrasonic spot welding according to the first example embodiment.
Figure 20:
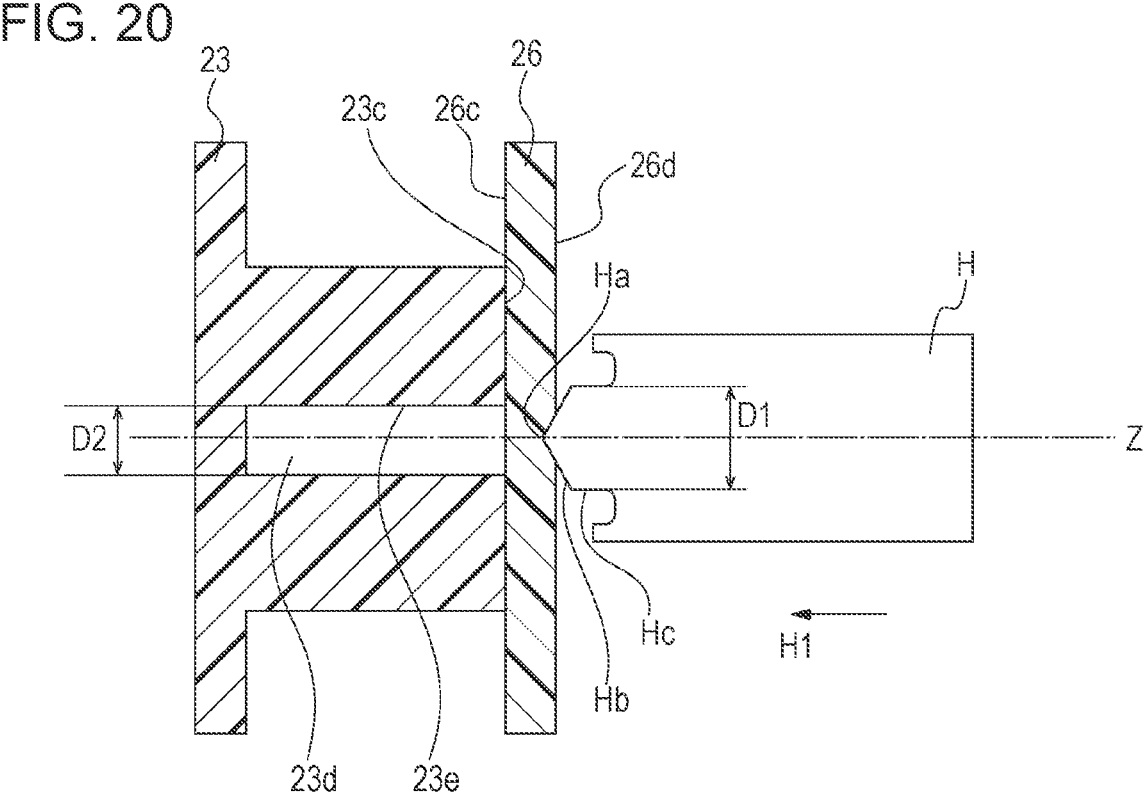
FIG. 20 is a cross-sectional view illustrating joining by ultrasonic spot welding according to the first example embodiment.

By moving the welding horn H in the horn entering direction H1, as illustrated in FIG. 19, the horn tip portion Ha abuts against the opposing surface 26d in the area where the retaining hole portion 23d having the diameter D2 is projected on the opposing surface 26d. In so doing, the welding horn H applies a predetermined load on the opposing surface 26d in the horn entering direction H1. By vibrating while applying the predetermined load on the opposing surface 26d, the welding horn H generates frictional heat between the horn tip portion Ha and the opposing surface 26d. A portion of the opposing surface 26d is melted by the frictional heat and, as illustrated in FIG. 20, the welding horn H enters into the side cover 26.

Figure 21:
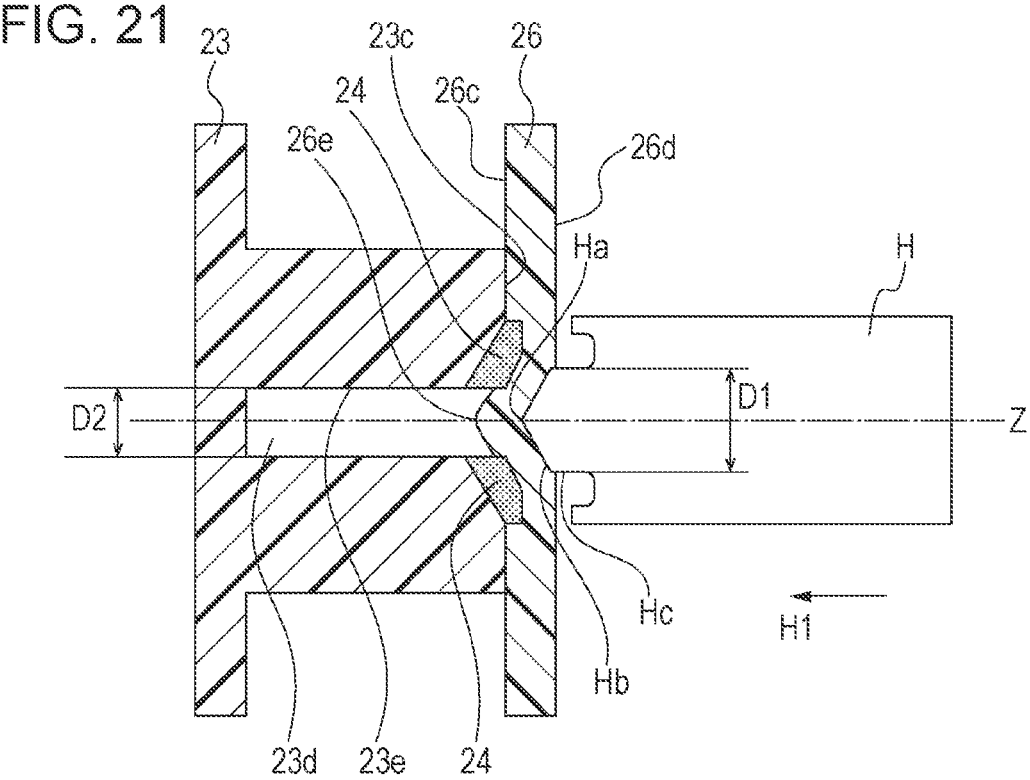
FIG. 21 is a cross-sectional view illustrating joining by ultrasonic spot welding according to the first example embodiment.

By having the welding horn H enter into the side cover 26 and apply ultrasonic vibration thereto, as illustrated in FIG. 21, the welding horn H further enters into the side cover 26. In the above, as if being pushed out by the entering welding horn H, a protrusion 26e is formed on the second contact surface 26c. The protrusion 26e is protruded into the retaining hole portion 23d. Furthermore, the ultrasonic vibration applied by the welding horn H is transmitted to the second contact surface 26c through the side cover 26. With the above, frictional heat is generated between the second contact surface 26c and the first contact surface 23c and the second contact surface 26c and the first contact surface 23c become melted; accordingly, a fused portion is formed. In the fused portion in the second contact surface 26c and the first contact surface 23c, the fused portion formed in the circumference of the retaining hole portion 23d is referred to as a first fused portion 24.

Figure 22:
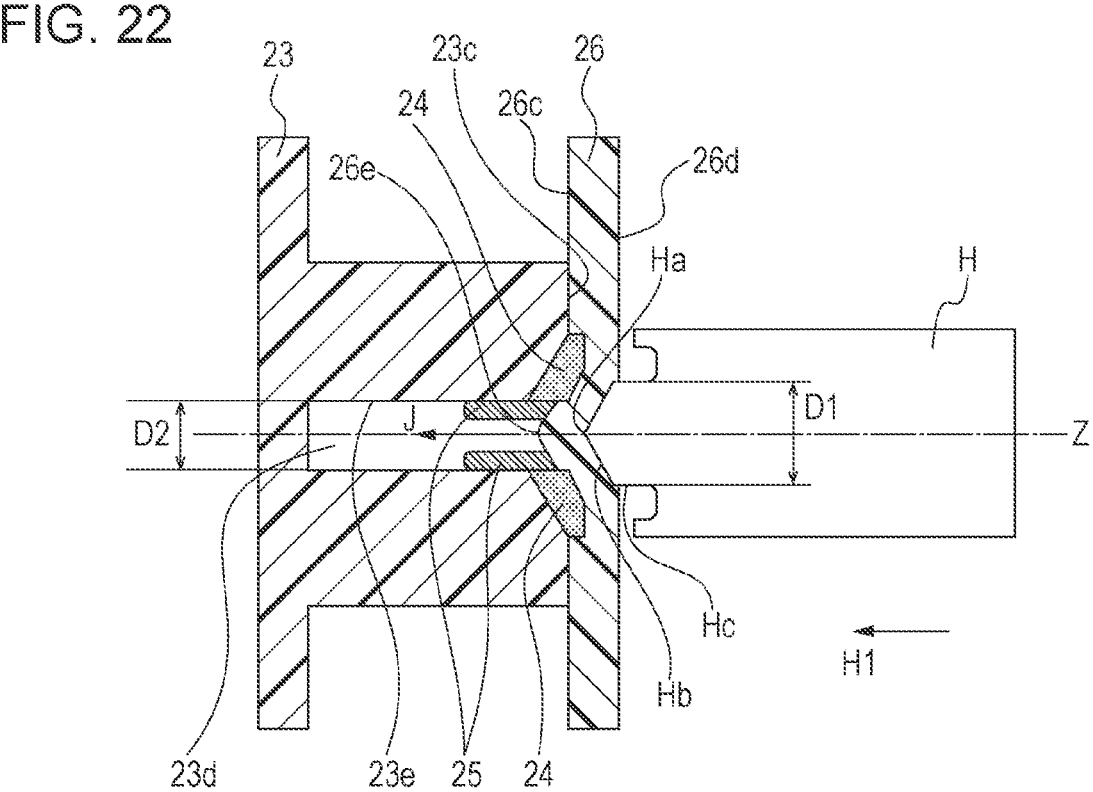
FIG. 22 is a cross-sectional view illustrating joining by ultrasonic spot welding according to the first example embodiment.

Moreover, a portion of the fused portion flows in an arrow J direction in FIG. 22 along a lateral surface portion 23e of the retaining hole portion 23d and makes its way into the retaining hole portion 23d. The above portion is referred to as a second fused portion 25. The second fused portion 25 is in contact with the lateral surface portion 23e of the retaining hole portion 23d. While the first fused portion 24 and the second fused portion 25 are connected and integral, the first fused portion 24 and the second fused portion 25 are depicted separately in FIG. 22 and other drawings.

Figure 1:
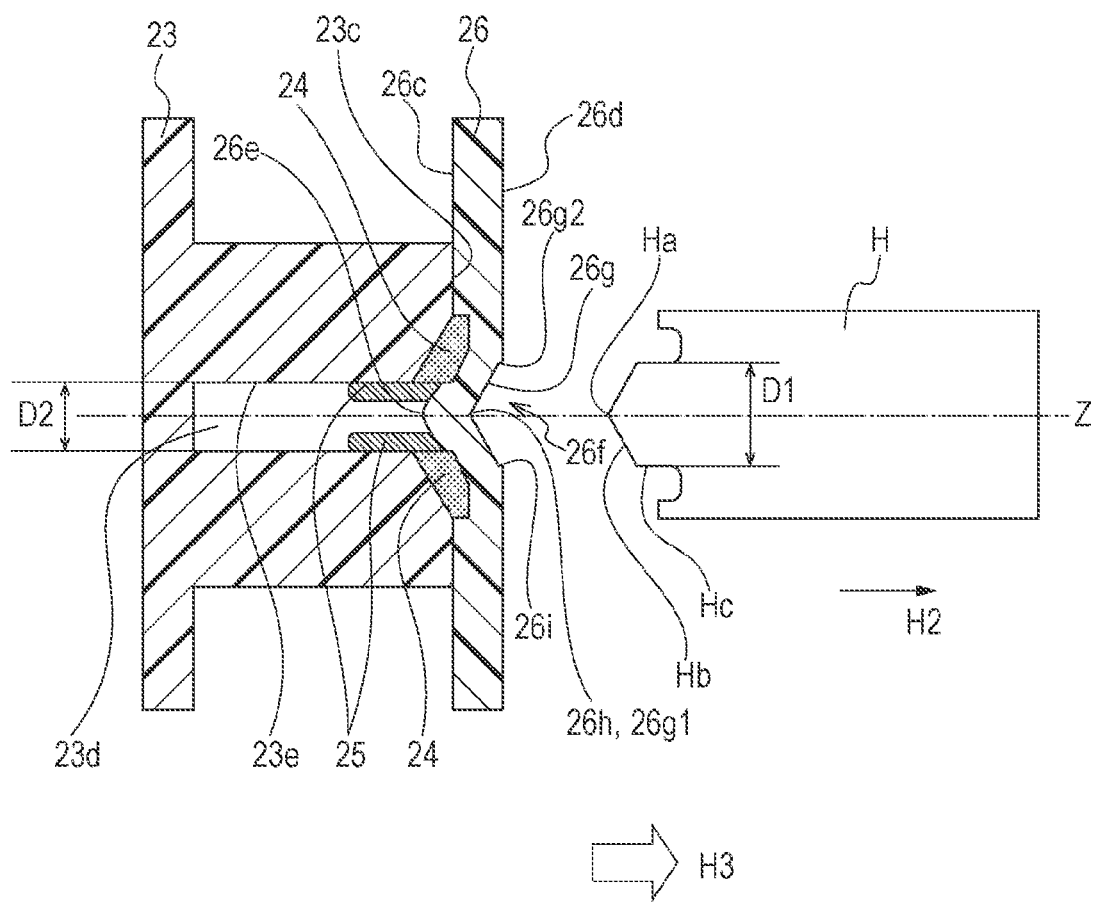
FIG. 1 is a cross-sectional view illustrating joining by ultrasonic spot welding according to a first example embodiment.

Subsequently, as illustrated in FIG. 1, the welding horn H is retracted in an arrow H2 direction, and the first fused portion 24 and the second fused portion 25 become cooled and solidified. With the above, together with the solidified first fused portion 24 and the second fused portion 25, the side cover 26 and the developer container 23 become integrally joined to each other.

With the above, the joining of the side cover 26 and the developer container 23 by ultrasonic spot welding is completed.

Note that while in the above description, the holding member 90 and the backup member 91 are moved at a timing different to that of the welding horn H; however, the above can be performed at the same time. In such a case, it is only sufficient that the first contact surface 23c and the second contact surface 26c are abutted against each other before the welding horn H abuts against the side cover 26.

In a state in which the side cover 26 and the developer container 23 are joined to each other, the second contact surface 26c covers the retaining hole portion 23d of the first contact surface 23c. Furthermore, the first contact surface 23c and the second contact surface 26c are in contact with each other. A recess 26f recessed towards the retaining hole portion 23d is formed in the side cover 26. Furthermore, at least a portion (the second fused portion 25) of the fused portion is situated inside the retaining hole portion 23d. In other words, the amount of fused portion entering between the second contact surface 26c and the first contact surface 23c that determine the longitudinal position of the side cover 26 and the developer container 23 can be reduced, and separation of the first contact surfaces 23c and the second contact surface 26c can be reduced. Furthermore, since the side cover 26 and the developer container 23 are joined not only at the first fused portion 24 but also at the second fused portion 25, the joining area is increased and the joining strength can be increased. In other words, as illustrated in FIG. 1, the first fused portion 24 and the second fused portion 25 are formed in a H3 direction, which is a direction in which the side cover 26 and the developer container 23 are separated, and a direction that intersects the H3 direction. Accordingly, separation strength of the side cover 26 with respect to the developer container 23 can be improved.

Figure 23:
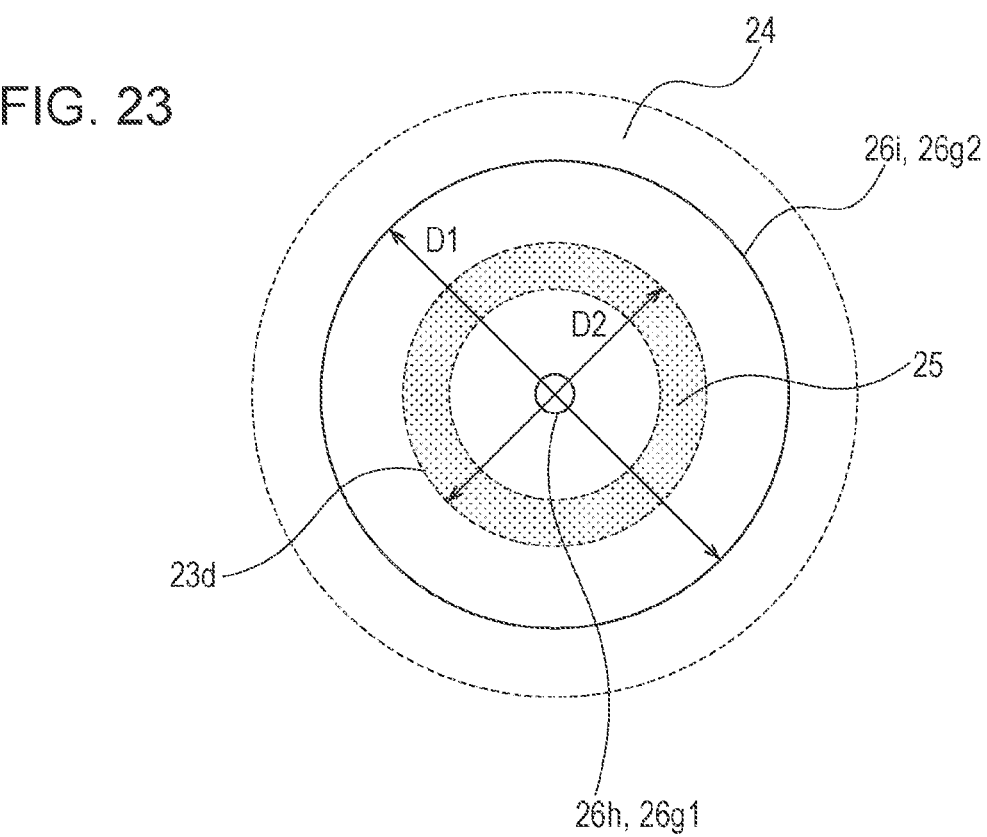
FIG. 23 is a plan view illustrating joining by ultrasonic spot welding according to the first example embodiment.

Referring now to FIGS. 1 and 23, the recess 26f will be described. FIG. 23 is a diagram of the recess 26f viewed in the direction normal to the first contact surface 23c. FIG. 23 is a diagram viewed from the side cover 26 side and in the direction normal to the first contact surface 23c.

As illustrated in FIG. 1, the recess 26f has a shape in which the shape of the welding horn H has been transferred. In other words, the recess 26f includes an inclination portion 26g formed by the tapered portion Hb. A recess tip portion 26h formed by the horn tip portion Ha is formed in the recess 26f. A cylindrical portion 26i formed by the cylindrical portion Hc is formed in the recess 26f.

The inclination portion 26g extends in a direction intersecting the normal line of the first contact surface 23c. An end portion of the inclination portion 26g positioned on the center side of the recess is referred to as a first end portion 26g1, and an end portion on the other side is referred to as a second end portion 26g2. The first end portion 26g1 is connected to the recess tip portion 26h. The second end portion 26g2 is connected to the cylindrical portion 26i. As illustrated in FIG. 23, when viewed in the direction normal to the first contact surface 23c, the first end portion 26g1 is positioned inside the retaining hole portion 23d. Furthermore, the second end portion 26g2 is positioned outside the retaining hole portion 23d. Moreover, an end portion of the first fused portion 24 is positioned outside the second end portion 26g2. Meanwhile, as illustrated in FIG. 1, the recess 26f is provided so as to have a depth that does not reach the first contact surface 23c. In other words, the recess 26f is positioned on an opposite side of the retaining hole portion 23d with respect to the first contact surface 23c.

By joining the side cover 26 and the developer container 23 by ultrasonic spot welding so that the recess 26f has such a shape, entering of a portion of the fused portion (the second fused portion 25) into the retaining hole portion 23d is facilitated. Furthermore, formation of the first fused portion 24 in the entire circumference of the retaining hole portion 23d is facilitated and the joining strength between the side cover 26 and the developer container 23 can be improved.

Note that in the description above, the side cover 26 and the bearing member 27 are configured as separate members, however, the side cover 26 and the bearing member 27 can be formed integrally.

Furthermore, in the present example embodiment, a method of joining the side cover 26 and the developer container 23 that are provided in the developing unit 20 has been described. However, the present disclosure is not limited to the above and can be used to join other components to each other. For example, the present disclosure can be used to join the drum bearing 73 and the drum frame 71 provided in the photoreceptor unit 60 to each other. Furthermore, the present disclosure can be used to join the bearing member 27 and the developer container 23 to each other.

Furthermore, while the cartridge of the present disclosure is detachably attachable to the apparatus main body, the cartridge may be one that is fixed to the apparatus main body.

Furthermore, the cartridge B includes rotary members such as the photosensitive drum 62 and the development roller 32. The cartridge B further includes sliding portions such as the drum-unit sliding portion 73a and the development roller sliding portion 27c that abut against and rotatably support the rotary members. In the present example embodiment, the fused portions are formed at positions that are distanced away from the sliding portions. By so doing, the rotations of the rotary members can be prevented from becoming unstable due to the melting of the sliding portions. By forming the fused portions away from the sliding portions that slide against the rotary members other than the photosensitive drum 62 and the development roller 32, the rotary members other than the photosensitive drum 62 and the development roller 32 can be rotated in a stable manner.

Furthermore, the cartridge B is provided with positioning portions (the supported portion 73b, the supported portion 73d, the regulated portion 71a, the supported portion 71f, and the regulated portion 71g) that set the position of the cartridge B with respect to the apparatus main body. In the present example embodiment, the fused portions are set at positions that are distanced away from the positioning portions. By so doing, the positioning of the cartridge can be prevented from becoming unstable due to the melding of the positioning portions.

In ultrasonic spot welding, the versatility of the device is high and components such as screws can be omitted. Accordingly, the cost of the components and the cost of the assembly device can be reduced. Furthermore, compared with a case using an adhesive agent, the time needed for the joining is short.

Furthermore, by adopting the present configuration, when joining two components (the side cover 26 and the developer container 23) by ultrasonic spot welding, space can be saved while achieving both the maintenance of positioning accuracy and a strong fixation.

The present disclosure is capable of reducing the amount of fused portion of the members entering into a portion between one member and the other member when a plurality of members are joined by ultrasonic spot welding.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2017-252541, filed Dec. 27, 2017, which is hereby incorporated by reference herein in its entirety.

What is claimed is:

1. A manufacturing method of a cartridge, the cartridge being attachable to an apparatus main body of an image forming apparatus, and the cartridge including a first member and a second member, the first member including a first surface and a hole provided in the first surface, and the second member including a second surface and a third surface disposed on an opposite side of the second surface, the manufacturing method comprising:

holding the first member and the second member so that the second surface covers the hole and so that the second surface and the first surface are in contact with each other; and joining the first member and the second member to each other by ultrasonic spot welding so that a portion of the third surface is melted and a recess recessed towards the hole is formed in the third surface and so that at least part of a fused portion of the first member and the second member enters the hole.

2. The manufacturing method according to claim 1, wherein the recess includes an inclination portion that extends in a direction intersecting a normal line of the first surface, the inclination portion including a first end portion positioned on a center side of the recess and a second end portion positioned on an opposite side of the first end portion, and wherein when viewed in a direction of the normal line, the first end portion is positioned inside the hole.

3. The manufacturing method according to claim 2, wherein when viewed in the direction of the normal line, the second end portion is positioned outside the hole.

4. The manufacturing method according to claim 2, wherein in the direction of the normal line, the recess is positioned on an opposite side of the hole with respect to the second surface.

5. The manufacturing method according to claim 1, wherein the cartridge includes a rotary member and a sliding portion that abuts against the rotary member and that rotatably supports the rotary member, and wherein the fused portion is formed at a position distanced away from the sliding portion.

6. The manufacturing method according to claim 5, wherein the rotary member is an image carrying member that carries an electrostatic latent image.

7. The manufacturing method according to claim 5,
wherein the rotary member is a developer carrying member that develops an electrostatic latent image.

8. The manufacturing method according to claim 1,
wherein the cartridge includes a positioning portion that positions the cartridge with respect to the apparatus main body, and
wherein the fused portion is formed at a position distanced away from the positioning portion.

9. The manufacturing method according to claim 1,
wherein the first member and the second member are joined by a welding horn, and
wherein the third surface is configured to contact the welding horn such that the recess is formed.

10. A cartridge being attachable to an apparatus main body of an image forming apparatus, the cartridge comprising:
a first member including a first surface and a hole; and
a second member including a second surface and a third surface disposed on an opposite side of the second surface, the second member being disposed so that the second surface covers the hole and so that the second surface and the first surface are in contact with each other,
wherein the first member and the second member are joined by ultrasonic spot welding so that a recess recessed towards the hole is formed in the third surface and so that at least part of a fused portion of the first member and the second member enters the hole.

11. The cartridge according to claim 10,
wherein the recess includes an inclination portion that extends in a direction intersecting a normal line of the first surface, the inclination portion including a first end portion positioned on a center side of the recess and a second end portion positioned on an opposite side of the first end portion, and
wherein when viewed in a direction of the normal line, the first end portion is positioned inside the hole.

12. The cartridge according to claim 11,
wherein when viewed in the direction of the normal line, the second end portion is positioned outside the hole.

13. The cartridge according to claim 11,
wherein in the direction of the normal line, the recess is positioned on an opposite side of the hole with respect to the second surface.

14. The cartridge according to claim 10,
wherein the cartridge includes a rotary member and a sliding portion that abuts against the rotary member and that rotatably supports the rotary member, and
wherein the fused portion is formed at a position distanced away from the sliding portion.

15. The cartridge according to claim 14,
wherein the rotary member is an image carrying member that carries an electrostatic latent image.

16. The cartridge according to claim 14,
wherein the rotary member is a developer carrying member that develops an electrostatic latent image.

17. The cartridge according to claim 10,
wherein the cartridge includes a positioning portion that positions the cartridge with respect to the apparatus main body, and
wherein the fused portion is formed at a position distanced away from the positioning portion.

* * * * *